(12) United States Patent
Gao et al.

(10) Patent No.: US 11,127,424 B1
(45) Date of Patent: Sep. 21, 2021

(54) THERMALLY-ASSISTED MAGNETIC RECORDING HEAD HAVING ACTIVE LAYER WITH QUANTUM DOT STRUCTURE

(71) Applicant: SAE Magnetics (H.K.) Ltd., Hong Kong (HK)

(72) Inventors: Kang Gao, Hong Kong (HK); Seiichi Takayama, Hong Kong (HK); Ryo Hosoi, Hong Kong (HK); Ryuji Fujii, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 16/950,885

(22) Filed: Nov. 17, 2020

(30) Foreign Application Priority Data

Oct. 5, 2020 (CN) .......................... 202011070298.5

(51) Int. Cl.
| | |
|---|---|
| *G11B 11/105* | (2006.01) |
| *G11B 5/48* | (2006.01) |
| *G11B 5/39* | (2006.01) |
| *G11B 13/04* | (2006.01) |
| *G11B 13/08* | (2006.01) |
| *G11B 5/00* | (2006.01) |

(52) U.S. Cl.
CPC .......... *G11B 5/4866* (2013.01); *G11B 5/3912* (2013.01); *G11B 5/4826* (2013.01); *G11B 13/04* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 2006/0222028 | A1* | 10/2006 | Hatori | B82Y 10/00 |
| | | | | 372/45.01 |
| 2008/0107377 | A1* | 5/2008 | Cho | G02B 6/125 |
| | | | | 385/32 |
| 2008/0232225 | A1* | 9/2008 | Cho | G11B 5/314 |
| | | | | 369/13.32 |
| 2009/0066963 | A1* | 3/2009 | Petek | G01B 9/04 |
| | | | | 356/450 |
| 2010/0128577 | A1* | 5/2010 | Kotani | G11B 5/314 |
| | | | | 369/13.24 |
| 2010/0260223 | A1* | 10/2010 | Kim | B82Y 20/00 |
| | | | | 372/45.01 |
| 2011/0205661 | A1 | 8/2011 | Komura et al. | |
| 2011/0229079 | A1* | 9/2011 | Matsumoto | G02B 6/124 |
| | | | | 385/37 |
| 2012/0155232 | A1 | 6/2012 | Schreck et al. | |
| 2012/0236394 | A1* | 9/2012 | Hayakawa | H01L 21/02463 |
| | | | | 359/328 |

(Continued)

FOREIGN PATENT DOCUMENTS

JP 2012084216 A 4/2012

*Primary Examiner* — Tan X Dinh

(57) ABSTRACT

A light source-unit includes a laser diode, a sub-mount which the laser diode is joined. The laser diode includes an optical generating layer including an active layer which emits laser-light and cladding layers being formed so as to sandwich the active layer. The active layer includes a quantum dot layer including a plurality of quantum dots, which respectively confine movements of carriers in the three-dimensional directions.

19 Claims, 32 Drawing Sheets

(56) References Cited

U.S. PATENT DOCUMENTS

| | | | |
|---|---|---|---|
| 2012/0250717 A1* | 10/2012 | Lauer | H01S 5/1082 |
| | | | 372/45.01 |
| 2014/0247849 A1* | 9/2014 | Kasuya | G11B 9/1409 |
| | | | 372/45.01 |
| 2015/0043318 A1* | 2/2015 | Kasuya | G11B 11/10545 |
| | | | 369/13.33 |
| 2015/0154988 A1 | 6/2015 | Takei et al. | |
| 2015/0364899 A1 | 12/2015 | Tatah et al. | |
| 2015/0380035 A1 | 12/2015 | Takei et al. | |
| 2017/0287513 A1* | 10/2017 | Shimazawa | G11B 5/187 |
| 2018/0211686 A1* | 7/2018 | Nishimura | G11B 5/314 |
| | | | 369/13.33 |
| 2019/0080713 A1* | 3/2019 | Ozyilmaz | G11B 5/7366 |
| | | | 369/13.33 |

\* cited by examiner

THERMALLY-ASSISTED MAGNETIC RECORDING HEAD HAVING ACTIVE LAYER WITH QUANTUM DOT STRUCTURE

CROSS REFERENCE TO RELATED APPLICATIONS

The present application claims the benefit of Chinese Patent Application No. 202011070298.5 filed on Oct. 5, 2020, the contents of which are incorporated herein by reference in their entirety.

BACKGROUND

Field of the Invention

The present invention relates to a light source-unit, which is used for a thermally assisted magnetic head recording data on a magnetic recording medium by thermally assisted magnetic recording using near-field light, the thermally assisted magnetic head, a head gimbal assembly and a hard disk drive each having the thermally assisted magnetic head.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are stacked have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The following structure is conventionally known as the typical structure.

The structure which the light source is provided on the surface of the slider (for example, US2015-0364899 (also called patent document 2), US2011-0205661 (also called patent document 3), US2015-154988 (also called patent document 4), US 2015-0380035 (also called patent document 5), JP2012-084216 (also called patent document 6)).

SUMMARY OF THE INVENTION

An action, which is called "mode hopping", sometimes occurs in a laser diode as the light source, in case of the thermally assisted magnetic head, having the above-described conventional structure. The mode hopping means an unstable action which the oscillation wavelength of the laser diode changes suddenly.

Because the oscillation wavelength of the laser diode changes suddenly, when the mode hopping occurs, fluctuation about light emission intensity, wavelength, phase, occurs in the laser diode as a noise. Then, it makes optical output of the laser diode unstable. Thereby, a recording characteristic of the thermally assisted magnetic head becomes unstable. Then, when data is recorded on the magnetic recording medium by the thermally assisted magnetic head, error on the data is easy to occur, therefore, a recording quality is lowered. Then, it is known that the mode hopping occurs with a change of temperature, a change of optical output.

Besides, it is also known that the laser diode is susceptible to temperature, namely various characteristics of the laser diode, such as oscillation wavelength, optical output, ILV-curve or the like, change with temperature. For example, in the laser diode, as illustrated by I1, I2, I3, in FIG. 32, intensity of optical output largely changes by temperature.

Further, in case of the conventional thermally assisted magnetic head, temperature rises with the generation of heat in accordance with a data recording action of a recording head, and temperature also rises with the generation of heat in accordance with light emission of the laser diode. Whichever the cases occur, because the mode hopping of the laser diode is induced, the recording quality of the thermally assisted magnetic head is lowered.

Namely, the laser diode, which is sensitive to temperature, is placed in an environment which the change of temperature occurs easily, and it is extremely difficult to avoid the environment temperature variation, in case of the conventional thermally assisted magnetic head. Therefore, there is a possibility of an inducement of the mode hopping in the laser diode, thereby the recording quality is lowered.

In order to prevent the lowering of the recording quality, in the thermally assisted magnetic head, it is preferable that the laser diode is not susceptible to temperature, namely, the laser diode is insensible to temperature.

However, in the conventional thermally assisted magnetic head, the laser diode is susceptible to temperature, therefore, it is impossible that the recording quality of the thermally assisted magnetic head is not lowered.

Hence the present invention is made to solve the above problem, and it is an object to stabilize the recording quality of the thermally assisted magnetic head by devising the laser diode of a light source-unit so as to be insensible to temperature, in the light source-unit, the thermally assisted magnetic head having the light source-unit, the head gimbal assembly and the hard disk drive.

To solve the above problem, the present invention is a light source-unit, which is used for a thermally assisted magnetic head including: a laser diode; and a sub-mount which the laser diode is joined; the laser diode includes an optical generating layer including an active layer which emits laser-light and cladding layers being formed so as to sandwich the active layer, the active layer includes a quantum dot layer including a plurality of quantum dots, which respectively confine movements of carriers in the three-dimensional directions.

In case of the above-described light source-unit, it is possible that the active layer includes at least two quantum dot layers, the active layer includes a multi-layered structure which the at least two quantum dot layers are stacked.

Further, in case of the above-described light source-unit, it is possible that the quantum dot layer includes a low-density area of which arrangement density of the quantum dots is lower than the other areas.

Further, in case of the above-described light source-unit, it is also possible that the laser diode includes a stripe electrode being formed in a straight band-like shape, the quantum dot layer includes a low-density area of which arrangement density of the quantum dots is lower than the other areas, the low-density area is arranged in a stripe-area, corresponding to the stripe electrode.

Further, it is also possible that the low-density area is arranged in a window-area, of the stripe-area, corresponding to a laser light emitting part which laser light is emitted.

Further, it is also possible that the laser diode includes a stripe electrode being formed in a straight band-like shape, the multi-layered structure is a structure which window-formed quantum dot layers are stacked as the quantum dot layers, the window-formed quantum dot layer includes low-density areas of which arrangement density of the quantum dots are lower than the other areas, the low-density areas are arranged in window-areas, of stripe-areas corresponding to the stripe electrode, corresponding to a laser light emitting part which laser light is emitted.

Furthermore, it is also possible that the multi-layered structure is a structure which even dot layers and uneven dot layers are stacked alternately, the even dot layers include the quantum dots, being formed in almost the whole of the respective quantum dot layers, and the uneven dot layers include non-dot areas, in which the quantum dots are not formed.

Furthermore, it is possible that the non-dot areas are arranged in window-areas corresponding to laser light emitting part which laser light is emitted, in the respective uneven dot layers.

It is possible that the multi-layered structure is a structure which even dot layers and uneven dot layers are stacked so that the even dot layers sandwich the uneven dot layers, the even dot layers include the quantum dots, being formed in almost the whole of the respective quantum dot layers, and the uneven dot layers include non-dot areas, in which the quantum dots are not formed.

It is also possible that the non-dot areas are arranged in center-areas, including center parts of the uneven dot layers.

It is also possible that the quantum dot layer includes size different structure which sizes of the quantum dots, formed in the low-density areas, are larger than sizes of the quantum dots, formed in the areas other than the low-density areas.

It is also possible that the quantum dot layer includes composition-different structures which compositions of the quantum dots, formed in the low-density areas, are different from compositions of the quantum dots, formed in the areas other than the low-density areas.

It is also possible that the window-areas have lengths, of the direction along by an end surface of the active layer, being extended than the stripe-areas, in the respective quantum dot layers.

It is also possible that the window-areas have lengths, of the direction along by an end surface of the active layer, being extended than the stripe-areas, as they gradually approach the end surface of the active layer, in the respective quantum dot layers.

Further, the present invention provides a thermally assisted magnetic head including: a slider; and a light source-unit joined to the slider, the slider comprises a slider substrate and a magnetic head part, being formed in the slider substrate, the magnetic head part includes a waveguide in which laser light, emitted from the light source-unit, is irradiated, the light source-unit comprises a laser diode and a sub-mount which the laser diode is joined; the laser diode includes an optical generating layer including an active layer which emits laser-light and cladding layers being formed so as to sandwich the active layer, the active layer includes a quantum dot layer including a plurality of quantum dots, which respectively confine movements of carriers in the three-dimensional directions, the quantum dot layer opposes to the waveguide.

In case of the above-described thermally assisted magnetic head, it is possible that the active layer includes a multi-layer structure which the quantum dot layers are stacked.

Further, in case of the above-described thermally assisted magnetic head, it is possible that the quantum dot layer includes a low-density area of which arrangement density of the quantum dots are lower than the other areas.

Furthermore, it is possible that laser diode includes a stripe electrode being formed in a straight band-like shape, the quantum dot layer comprises a low-density area of which arrangement density of the quantum dots are lower than the other areas, the low-density area is arranged in a stripe-area, corresponding to the stripe electrode.

In this case, it is preferable that the low-density areas are arranged in window-areas corresponding to laser light emitting part which laser light is emitted.

Further, the present invention provides a head gimbal assembly including a thermally assisted magnetic head, the thermally assisted magnetic head including: a slider; and a light source-unit joined to the slider, the slider includes a slider substrate and a magnetic head part, being formed in the slider substrate, the magnetic head part comprises a waveguide in which laser light, emitted from the light source-unit, is irradiated, the light source-unit includes a laser diode and a sub-mount which the laser diode is joined; the laser diode comprises an optical generating layer including an active layer which emits laser-light and cladding layers being formed so as to sandwich the active layer, the active layer includes a quantum dot layer including a plurality of quantum dots, which respectively confine movements of carriers in the three-dimensional directions, the quantum dot layer opposes to the waveguide.

Then, the present invention provides a hard disk drive including a head gimbal assembly having a thermally assisted magnetic head, and a magnetic recording medium opposing the thermally assisted magnetic head, the thermally assisted magnetic head including: a slider; and a light source-unit joined to the slider, the slider includes a slider substrate and a magnetic head part, being formed in the slider substrate, the magnetic head part includes a waveguide in which laser light, emitted from the light source-unit, is irradiated, the light source-unit includes a laser diode and a sub-mount which the laser diode is joined; the laser diode includes an optical generating layer including an active layer which emits laser-light and cladding layers being formed so as to sandwich the active layer, the active layer includes a quantum dot layer including a plurality of quantum dots, which respectively confine movements of carriers in the three-dimensional directions, the quantum dot layer opposes to the waveguide.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of the Thermally Assisted Magnetic Head)

Figure 1:
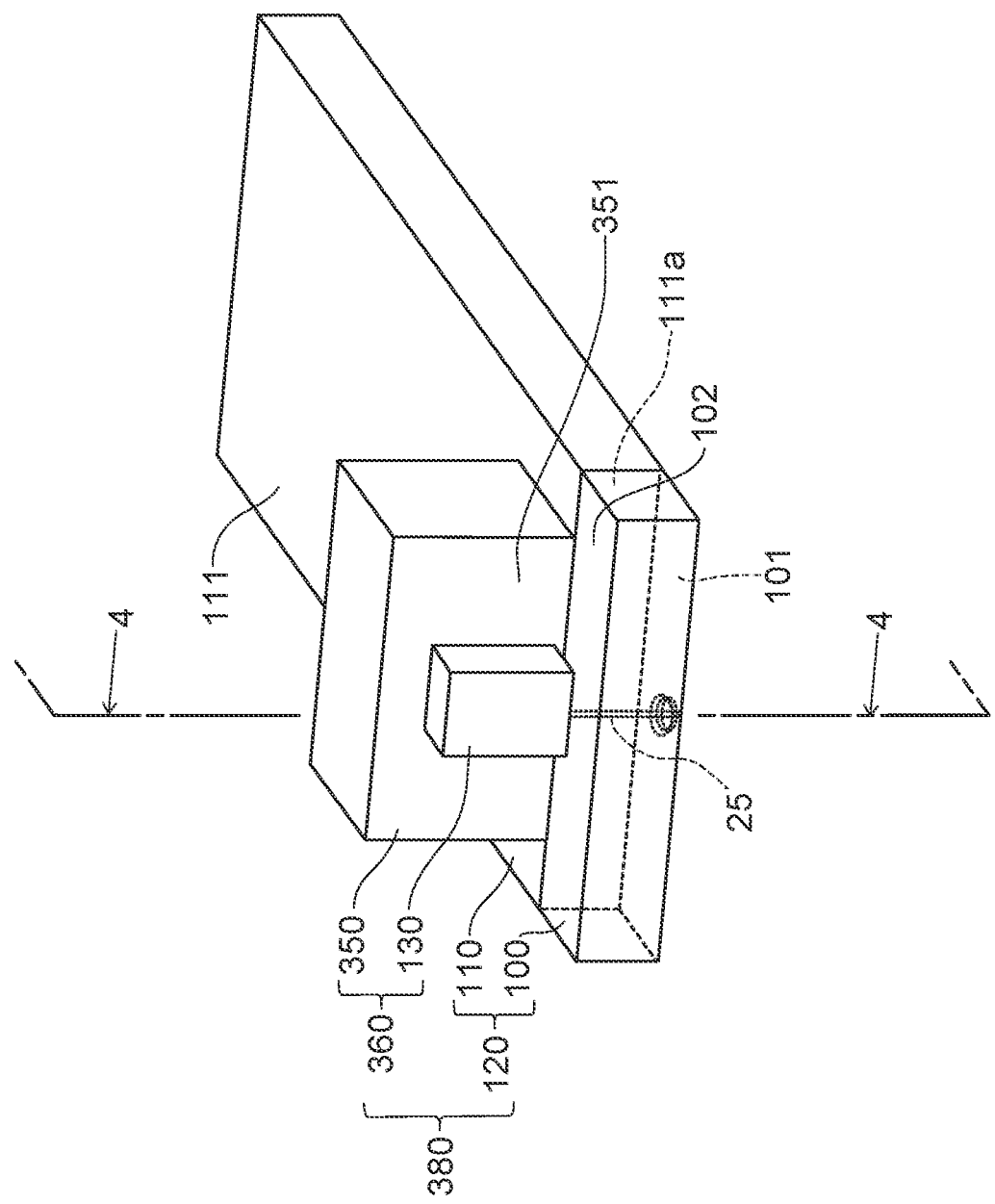
FIG. 1 is a perspective view of the thermally assisted magnetic head according to an embodiment of the present invention.
Figure 2:
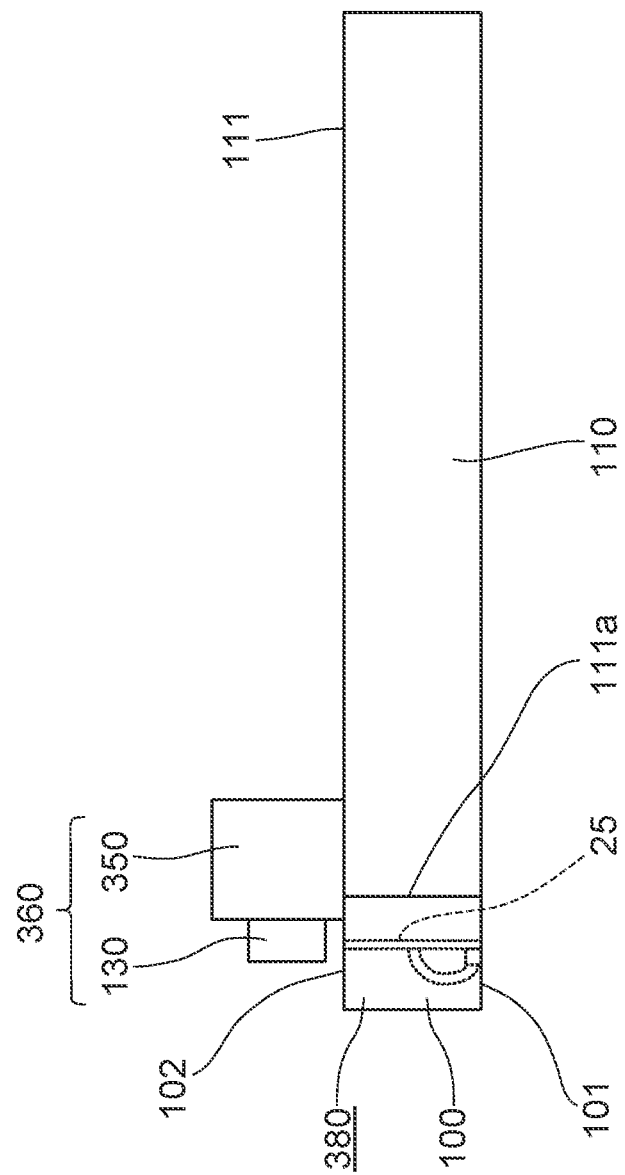
FIG. 2 is a side view of the thermally assisted magnetic head according to the embodiment of the present invention.
Figure 3:
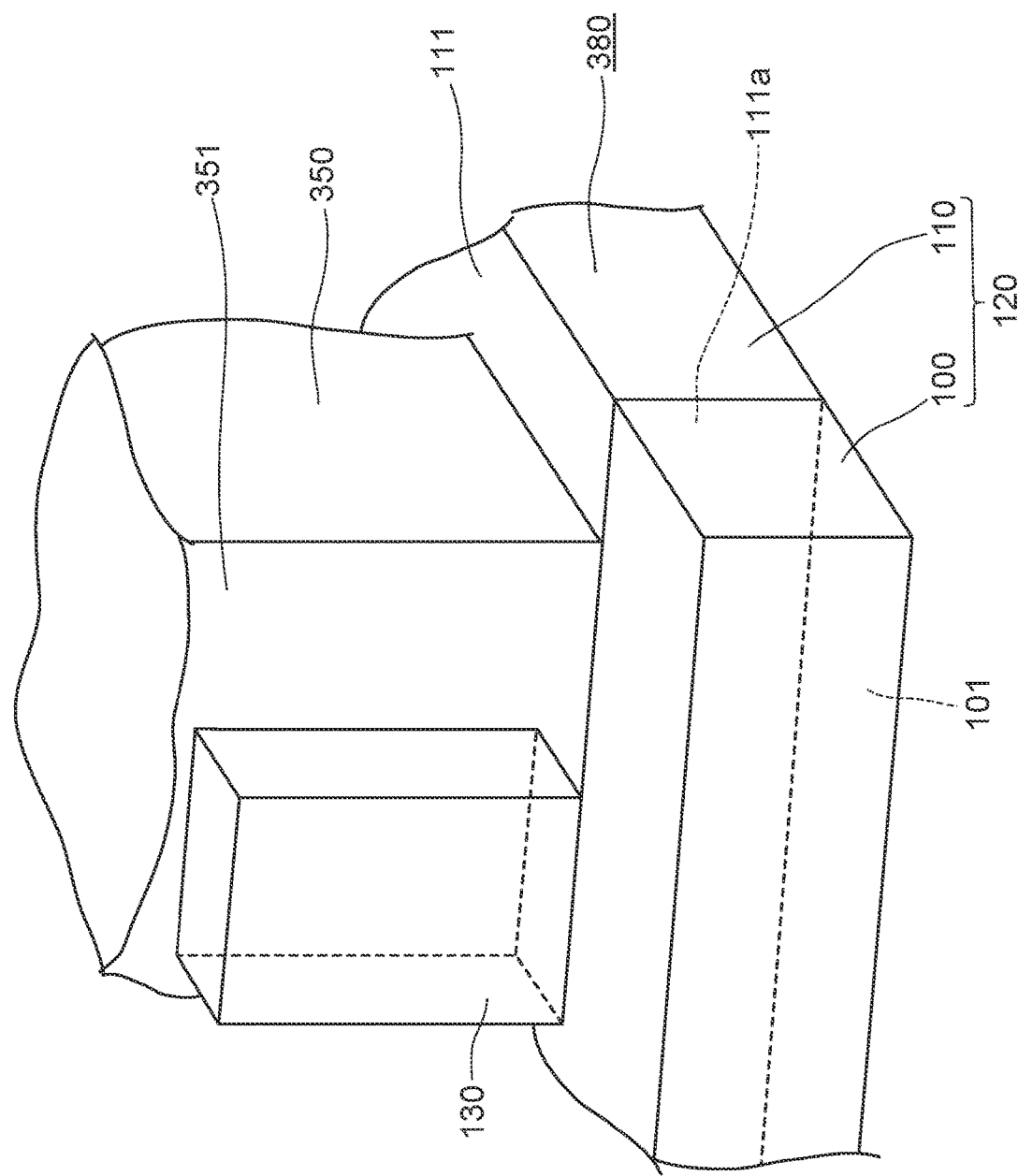
FIG. 3 is a perspective view, with enlargement, of the principal part of the thermally assisted magnetic head.
Figure 4:
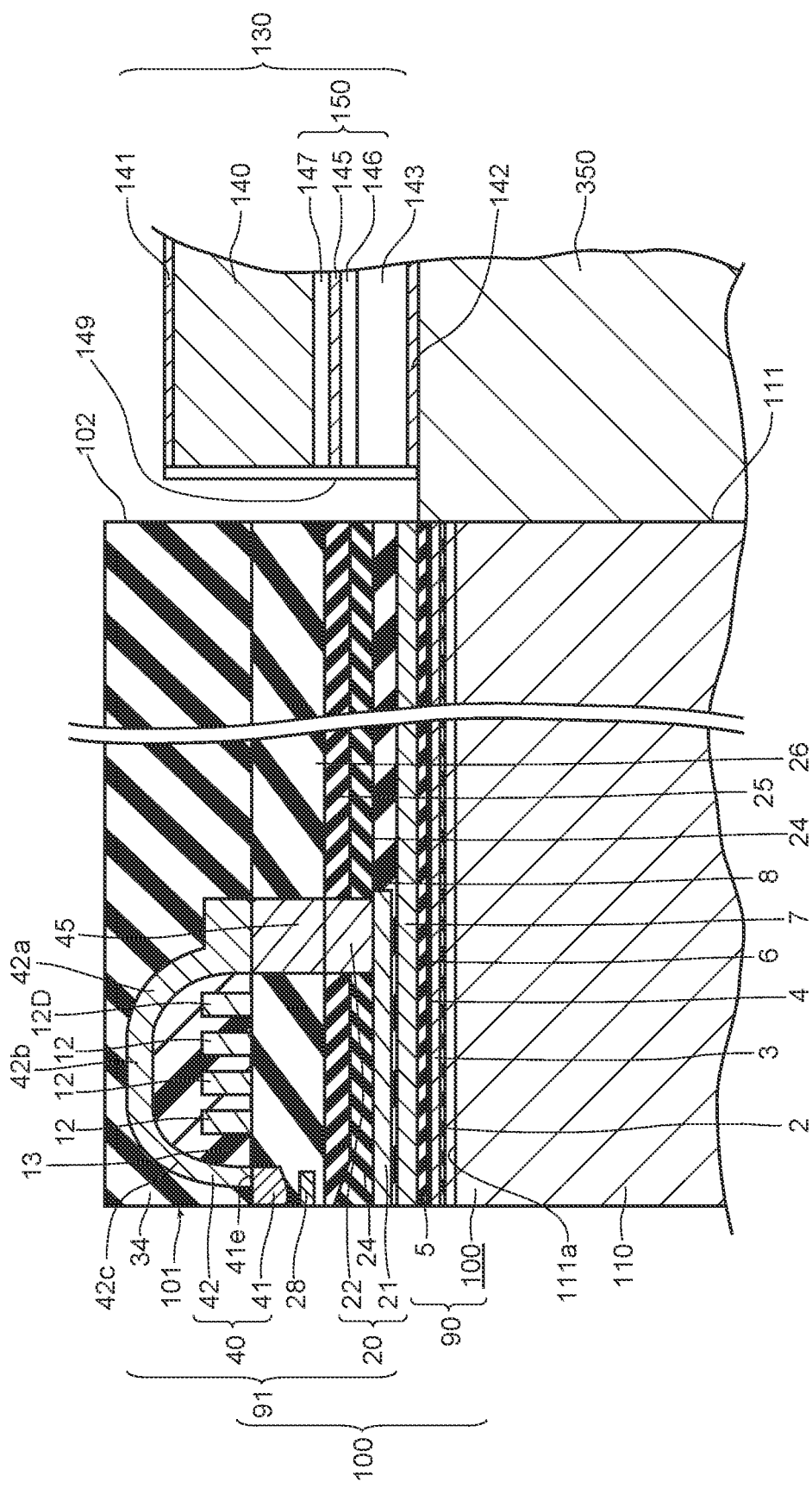
FIG. 4 is a sectional view of the principal part taken along the line 4-4 in FIG. 1.
Figure 5:
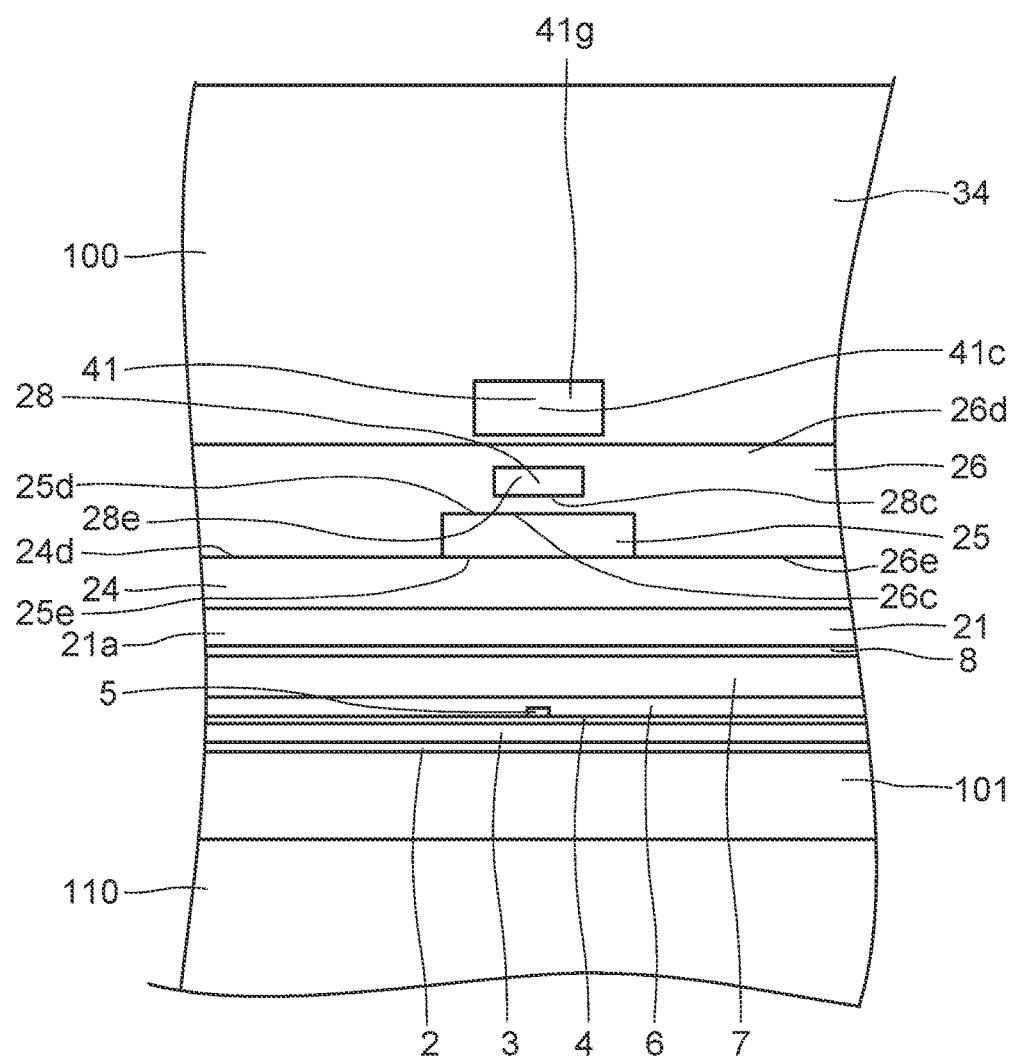
FIG. 5 is a front view, partially omitted, illustrating an air bearing surface of a magnetic head part.

To begin with, structure of the thermally assisted magnetic head according to the embodiment of the present invention will be explained with reference to FIG. 1 to FIG. 5. Here, FIG. 1 is a perspective view of a thermally assisted magnetic head 380 according to the embodiment of the present invention, FIG. 2 is a side view of the thermally assisted magnetic head 380 according to the embodiment of the present invention, FIG. 3 is a perspective view, with enlargement, of the principal part of the thermally assisted magnetic head 380. FIG. 4 is a sectional view of principal part taken along the line 4-4 in FIG. 1, FIG. 5 is a front view, partially omitted, illustrating a medium opposing surface (Air Bearing Surface, which will hereinafter be referred also to as "ABS") 101 of the magnetic head part 100.

The thermally assisted magnetic head 380 has a slider 120 and a light source-unit 360 joined to the slider 120. The thermally assisted magnetic head 380 has a complex-slider-structure which the light source-unit 360 is joined to the slider 120. A later-described sub-mount 350 of the light source-unit 360 is joined to the slider 120 to constitute the thermally assisted magnetic head 380.

The slider 120 has a slider-substrate 110 and the magnetic head part 100 formed on the slider-substrate 110.

The slider-substrate 110 is made of ceramic material such as aluminum oxide-titanium carbide ($Al_2O_3.TiC$) or the like, and it is formed in a rectangular parallelepiped shape. The slider-substrate 110 has the ABS 101 as the medium opposing surface, opposing to the magnetic recording medium, a light source placing surface 111, arranged in the rear side of the ABS 101. A part, of the light source placing surface 111, of the magnetic head part 100 side is a light source-opposing surface 102. The light source-opposing surface 102 opposes to the later-described laser diode 130 of the light source-unit 360.

The thermally assisted magnetic head 380 includes the light source-unit 360, and the light source-unit 360 includes the laser diode 130.

In this embodiment, a later-described active layer 145, being included in the laser diode 130, includes quantum dot layers 161 to 165, which a plurality of quantum dots 166 are formed. Therefore, variations of characteristics, in accordance with the change of temperature, are hard to occur in the laser diode 130, the laser diode 130 is hard to be affected by temperature. Namely, the laser diode 130 is devised so as to be insensible to temperature. Therefore, the recording quality of the thermally assisted magnetic head 380 is stable.

(Magnetic Head Part)

Subsequently, the magnetic head part 100 will be explained with mainly reference to FIG. 4 to FIG. 5. The magnetic head part 100 has a reproducing head 90 and a recording head 91. The magnetic head part 100 has a structure which the reproducing head 90 and the recording head 91 are stacked.

The reproducing head 90 has an MR device 5, arranged near the ABS 101, for detecting a magnetic signal. The reproducing head 90 comprises a lower shield layer 3, a lower shield gap film 4, an upper shield gap film 6 and an upper shield layer 7.

Then, an insulating layer 2 is further formed on a thin-film stacked surface 111a of the slider-substrate 110, and the lower shield layer 3 made of a magnetic material is formed on the insulating layer 2. Further, the lower shield gap film 4, as an insulating film, is formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head 91 has a thin-film coil 12, a return magnetic layer 20, a core layer 25, a lower dielectric-layer 24, an upper dielectric-layer 26, a near-field light generating layer 28, an overcoat layer 34, a main magnetic pole layer 40, and a linking magnetic pole layer 45, and has a structure in which they are stacked on the thin-film stacked surface 111a.

The thin-film coil 12 has four turn parts. The thin-film coil 12 is wound like a flat spiral about a later-described yoke magnetic pole layer 42 of the main magnetic pole layer 40.

The four turn parts are arranged at respective positions having different distances from the ABS 101. Among them, the turn part 12D is a part arranged at a position most distant from the ABS 101 among the four turn parts of the thin-film coil 12. The four turn parts are insulated from each other by a photoresist 13.

When a current modulated according to data to be recorded on the magnetic recording medium flows through the thin-film coil 12, the current causes the thin-film coil 12 to generate a recording magnetic field.

The return magnetic pole layer 20 has a connecting magnetic pole layer 21, and a rear magnetic pole layer 22. The connecting magnetic pole layer 21 has a magnetic pole end face 21a arranged within the ABS 101 and has a portion that is more distant from the ABS 101 than the magnetic pole end face 21a being embedded in the insulating layer 8. The connecting magnetic pole layer 21 has a size reaching a position more distant from the ABS 101 than the turn part 12D. To the connecting magnetic pole layer 21, the rear magnetic pole layer 22 is joined at a position more distant from the ABS 101 than the turn part 12D.

The rear magnetic pole layer 22 is arranged at a position more distant from the ABS 101 than the turn part 12D, and it is joined to the connecting magnetic pole layer 21 and the later-described linking magnetic pole layer 45.

The return magnetic pole layer 20 is provided to return a magnetic flux to the main magnetic pole layer 40. When a magnetic flux generated by the recording magnetic field is emitted from a later-described magnetic pole end face 41g of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 45 and reaches the main magnetic pole layer 40.

The core layer 25 is a waveguide which guides laser light, generated by the later-described laser diode 130 of the light source-unit 360, from the light source-opposing surface 102 to the ABS 101. The core layer 25, as illustrated in FIG. 4, is formed along with a depth direction, passing through between the linking magnetic pole layer 45, from the ABS 101 to the light source-opposing surface 102.

The core layer 25 is formed with dielectric such as tantalum oxide ($TaO_x$) or the like. For example, the core layer 25 is able to be formed with $Ta_2O_5$ (for example, the refractive index is about 2.16).

The core layer 25 is formed so as to be accommodated in a later-described concave part 26c of the upper dielectric-layer 26, on an upper surface 24d of the lower dielectric-layer 24. Further, an upper surface 25d and both side surfaces, of the core layer 25, are in contact with the upper dielectric-layer 26, and a lower surface 25e, of the core layer 25, is in contact with the lower dielectric-layer 24.

Then, the upper dielectric-layer 26 and the lower dielectric-layer 24 are arranged in the surrounding of the core layer 25, the cladding layer is constituted by the upper dielectric-layer 26 and the lower dielectric-layer 24.

The upper dielectric-layer 26 is formed in a substantially flat plate shape having a width larger than the width of the magnetic pole end part layer 41. The upper dielectric-layer 26 is formed with dielectric, having the lower refractive index than the core layer 25, for example, such as aluminum oxide ($AlO_x$) or the like. For example, the upper dielectric-layer 26 is able to be formed with alumina ($Al_2O_3$, for example, the refractive index is about 1.63). Then, the concave part 26c is formed on the lower surface 26e of the upper dielectric-layer 26, the core layer 25 is accommodated in the concave part 26c.

The lower dielectric-layer 24 is formed so as to be in contact with the lower surface 25e of the core layer 25 and the lower surface 26e of the upper dielectric-layer 26. The lower dielectric-layer 24 is able to be formed with dielectric such as aluminum oxide ($AlO_x$) or the like, similar with the upper dielectric-layer 26.

For example, the lower dielectric-layer 24 is able to be formed with alumina ($Al_2O_3$).

The near-field light generating layer 28 has a structure formed in a rectangular shape as a whole, seen from the ABS 101.

The near-field light generating layer 28 is made of metal and formed of, for example, one of Au, Ag, Al, Cu, Pd, Pt, Rh, Ir or an alloy made of a plurality of those elements.

The near-field light generating layer 28 has a bottom part 28c. The bottom part 28c is arranged at the deepest positions of the near-field light generating layer 28. The bottom part 28c extends from the ABS 101 in the depth direction. The end surface of the bottom part 28c on the ABS 101 side is arranged within the ABS 101. This end surface is a generating end part 28e. The generating end part 28e generates near-field light for heating the magnetic recording medium.

The main magnetic pole layer 40 has the magnetic pole end part layer 41 and the yoke magnetic pole layer 42. The magnetic pole end part layer 41 and the yoke magnetic pole layer 42 have a symmetrical structure formed to be bilaterally symmetrical about a front end part 41c.

The front surface including the front end part 41c constitutes the magnetic pole end surface 41g. The magnetic pole end surface 41g is arranged within the ABS 101. The yoke magnetic pole layer 42 is joined to an upper surface 41e of the magnetic pole end part layer 41.

The yoke magnetic pole layer 42 has a rear magnetic pole layer 42a, a middle magnetic pole layer 42b, and a front magnetic pole layer 42c. The yoke magnetic pole layer 42 has a curved structure extending from the ABS 101 in the depth direction and leading to the linking magnetic pole layer 45 straddling the thin-film coil 12.

The rear magnetic pole layer 42a is arranged at a position more distant from the ABS 101 than the four turn parts of the thin-film coil 12. The rear magnetic pole layer 42a has a lateral width larger than that of the middle magnetic pole layer 42b (the largest lateral width in the yoke magnetic pole layer 42) and is joined to the linking magnetic pole layer 45. The middle magnetic pole layer 42b is arranged above the thin-film coil 12. The middle magnetic pole layer 42b is connected to the rear magnetic pole layer 42a and the front magnetic pole layer 42c. The middle magnetic pole layer 42b has a lateral width gradually getting smaller as it approaches to the ABS 101. The front magnetic pole layer 42c is formed in a downward curved structure getting closer to the magnetic pole end part layer 41 as it approaches to the ABS 101. The front magnetic pole layer 42c is joined to the surface 41e of the magnetic pole end part layer 41.

The linking magnetic pole layer 45 is arranged in a manner to hold the core layer 25 from both right and left sides at a position more distant from the ABS 101 than the thin-film coil 12. Further, the linking magnetic pole layer 45 is joined to the rear magnetic pole layer 22. The linking magnetic pole layer 45 magnetically links the return magnetic pole layer 20 to the main magnetic pole layer 40, and has a role of returning, to the main magnetic pole layer 40, the magnetic flux flown back to the return magnetic pole layer 20.

(Light Source-Unit)

Figure 6:
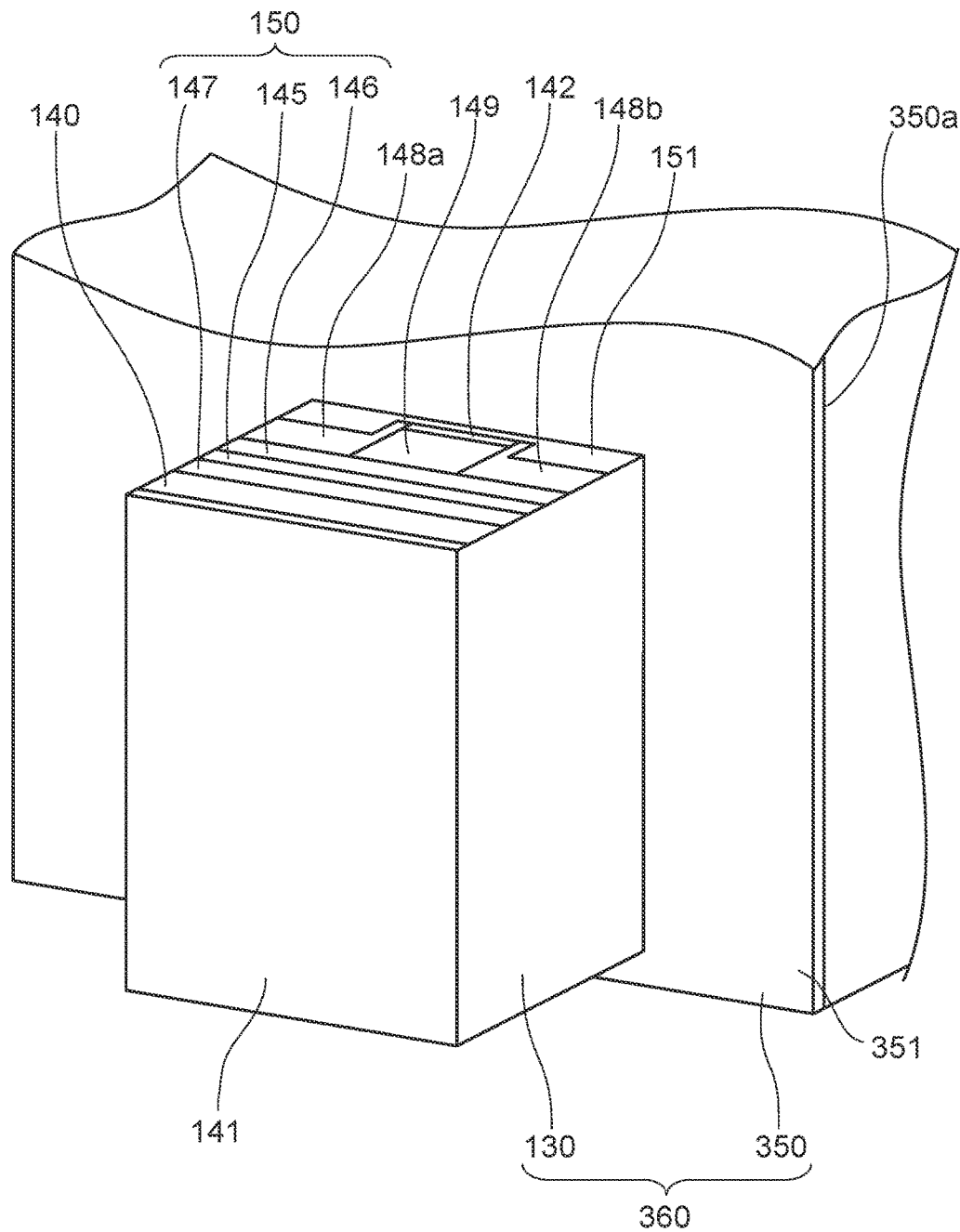
FIG. 6 is a perspective view showing the principal part of the light source-unit which is used for the thermally assisted magnetic head.
Figure 7:
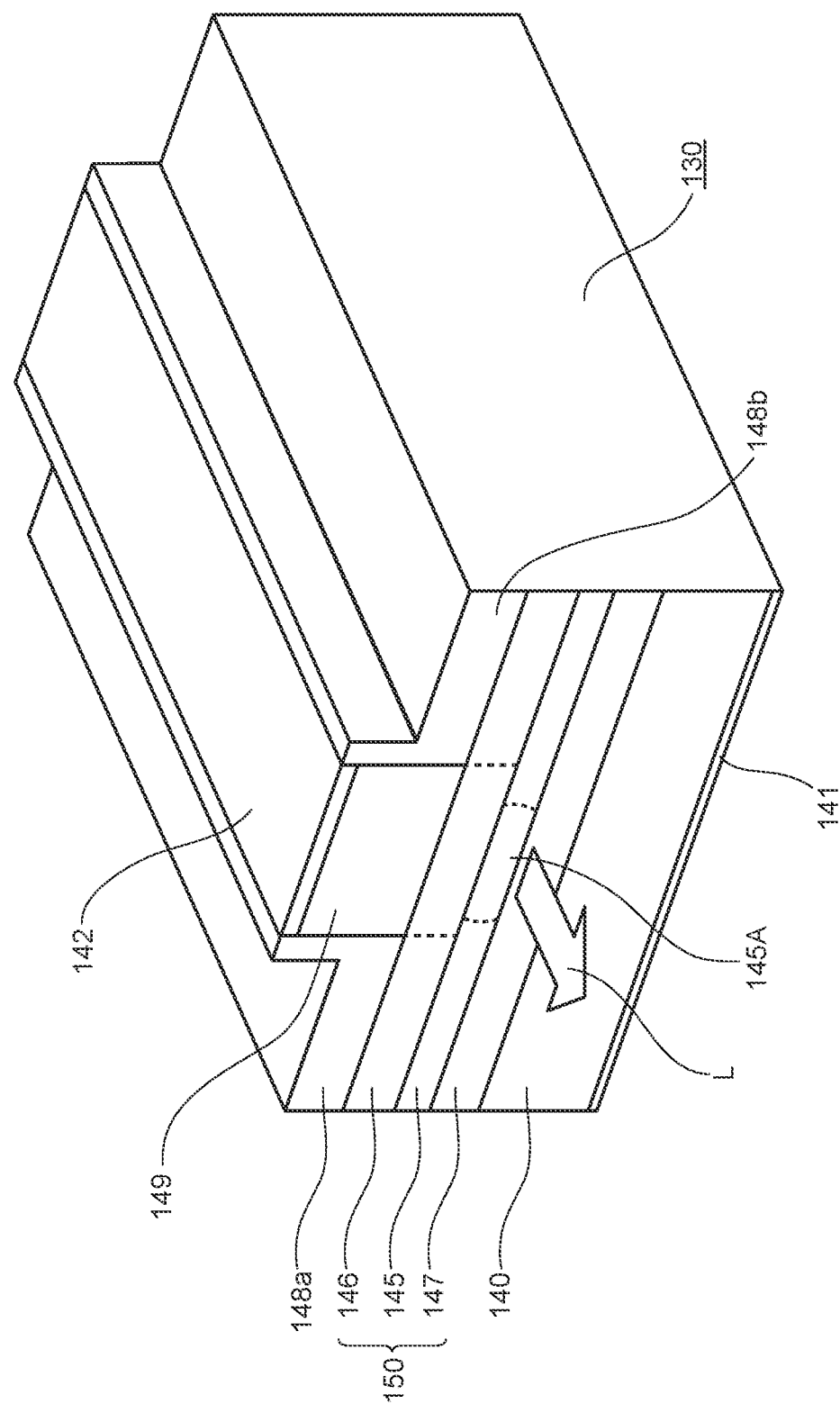
FIG. 7 is a perspective view showing the laser diode.
Figure 8:
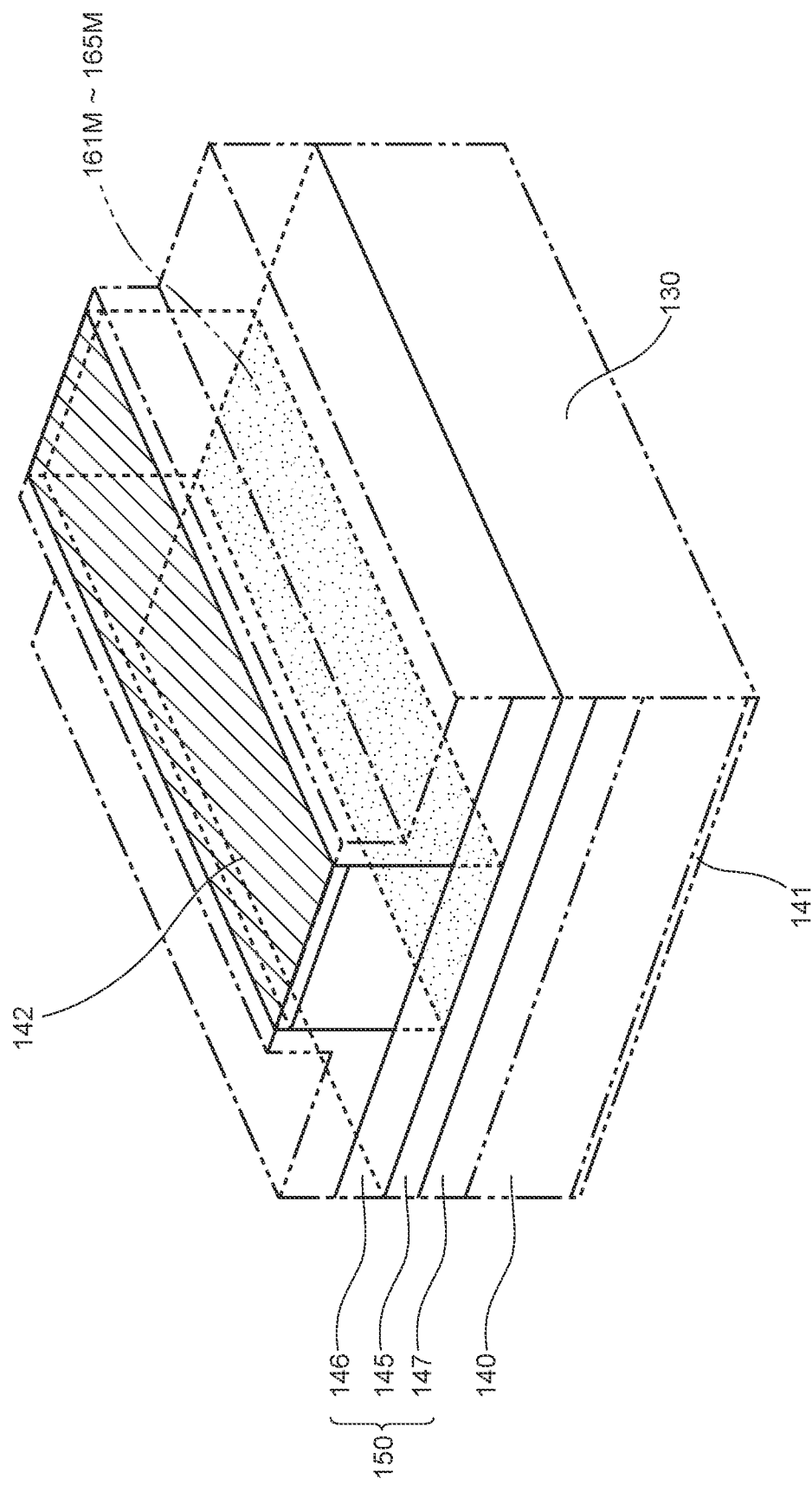
FIG. 8 is a perspective view showing the laser diode so as to clarify a stripe p-electrode and a stripe-area of an active layer.
Figure 9:
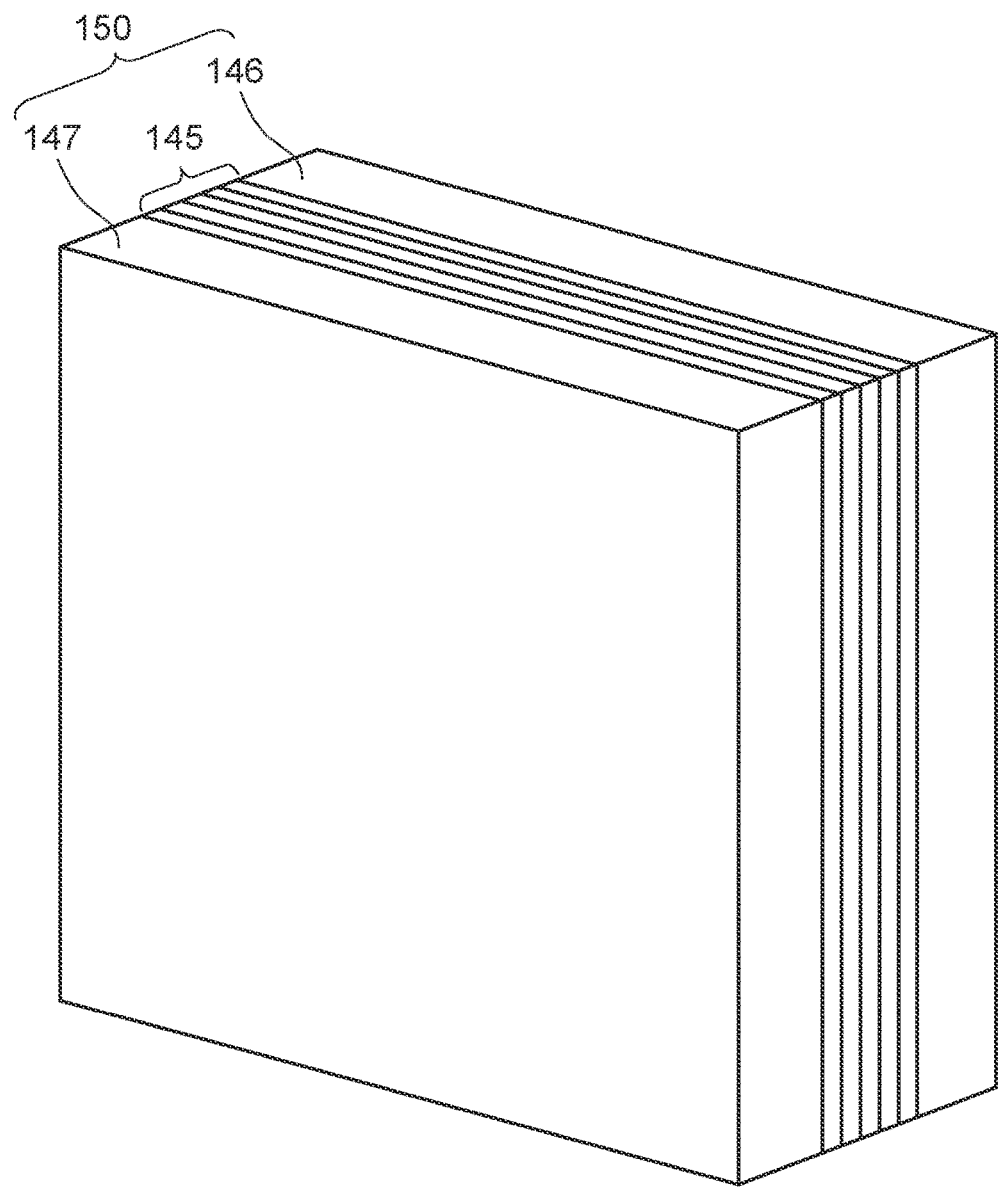
FIG. 9 is a perspective view showing an optical generating layer being included in the laser diode.
Figure 10:
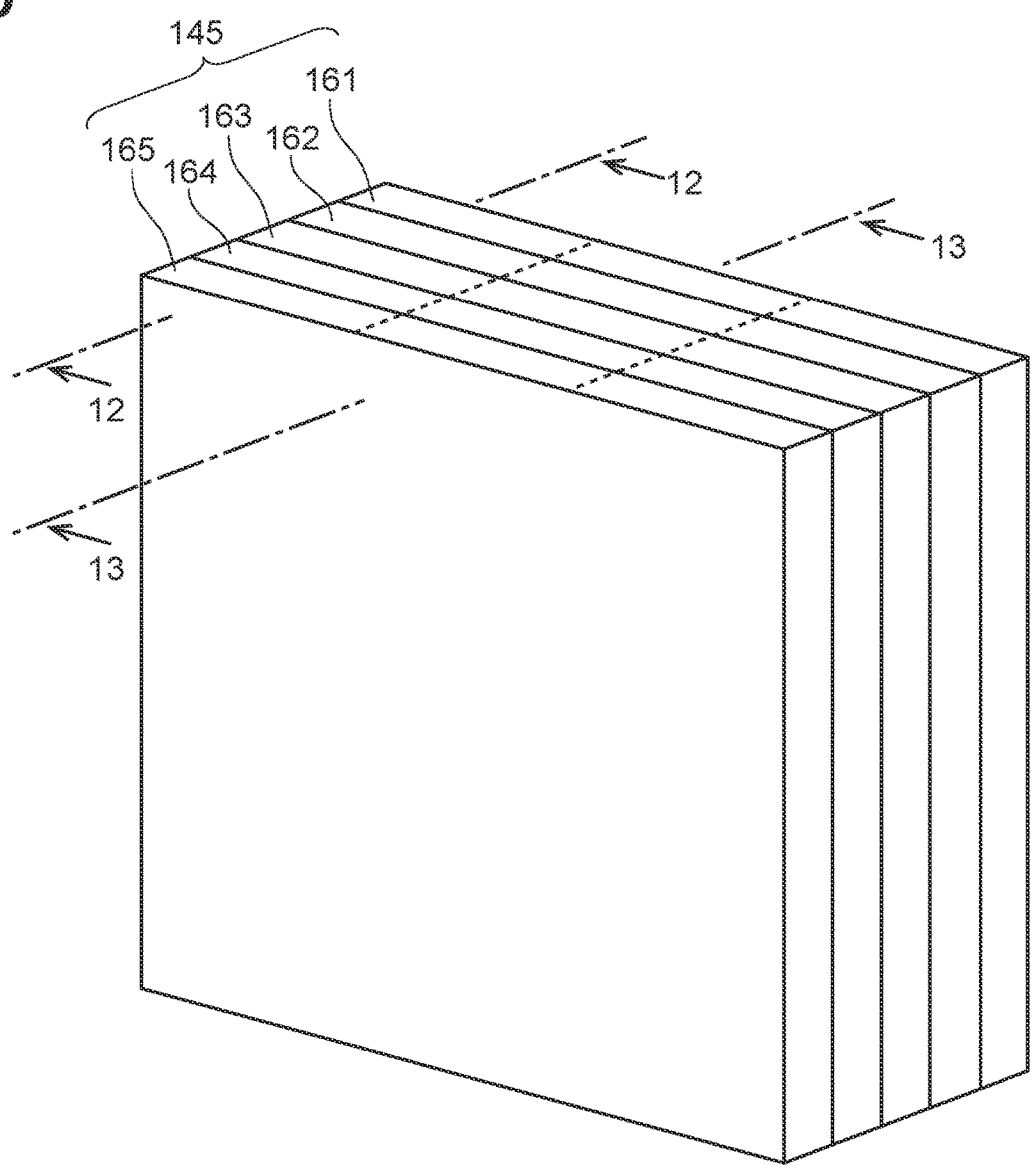
FIG. 10 is a perspective view showing the active layer which is included in the thermally assisted magnetic head according to the embodiment of the present invention.
Figure 11:
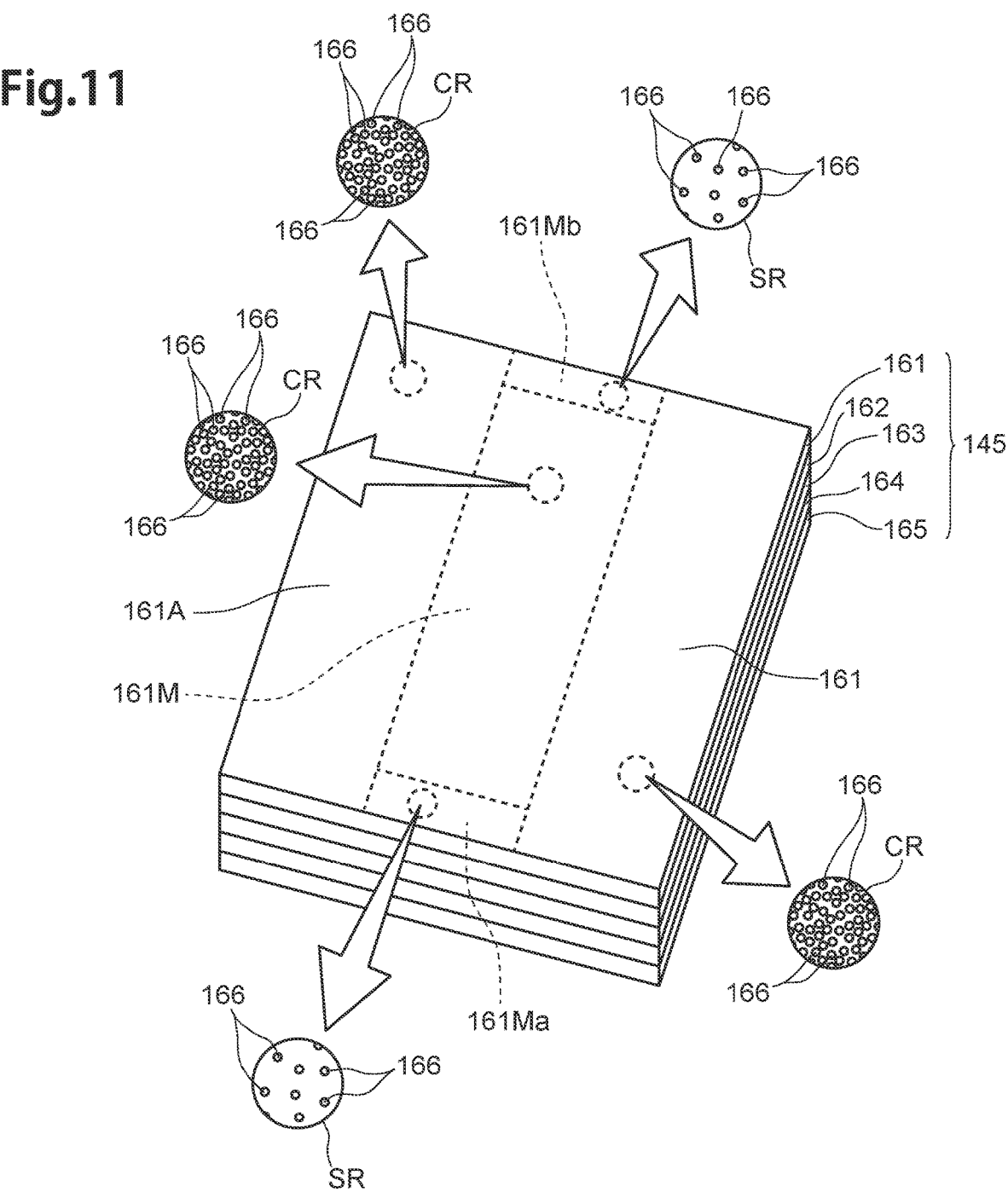
FIG. 11 is a perspective view showing the active layer, seen from a first layered quantum dot layer.
Figure 12:
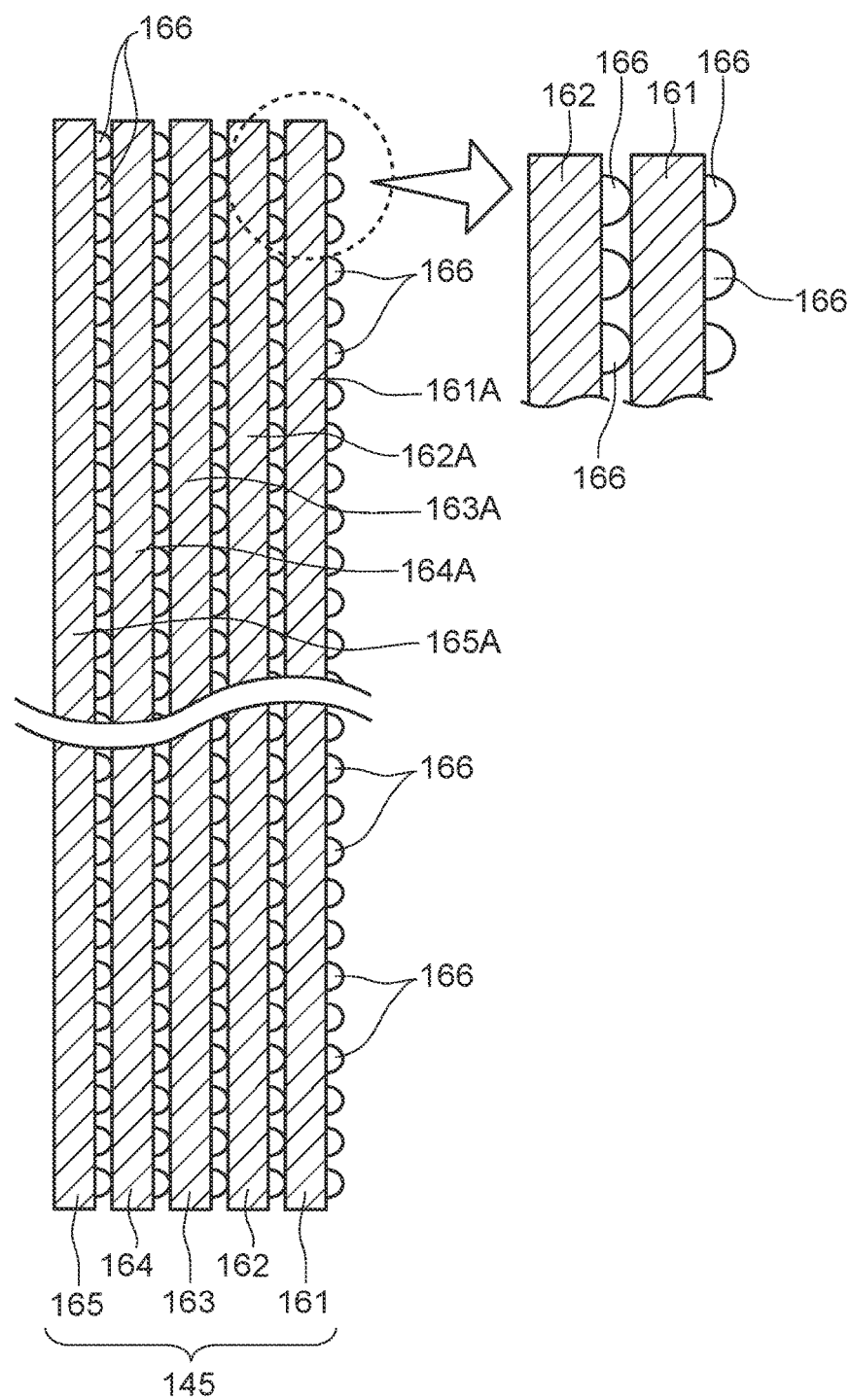
FIG. 12 is a sectional view taken along the line 12-12 in FIG. 10.
Figure 13:
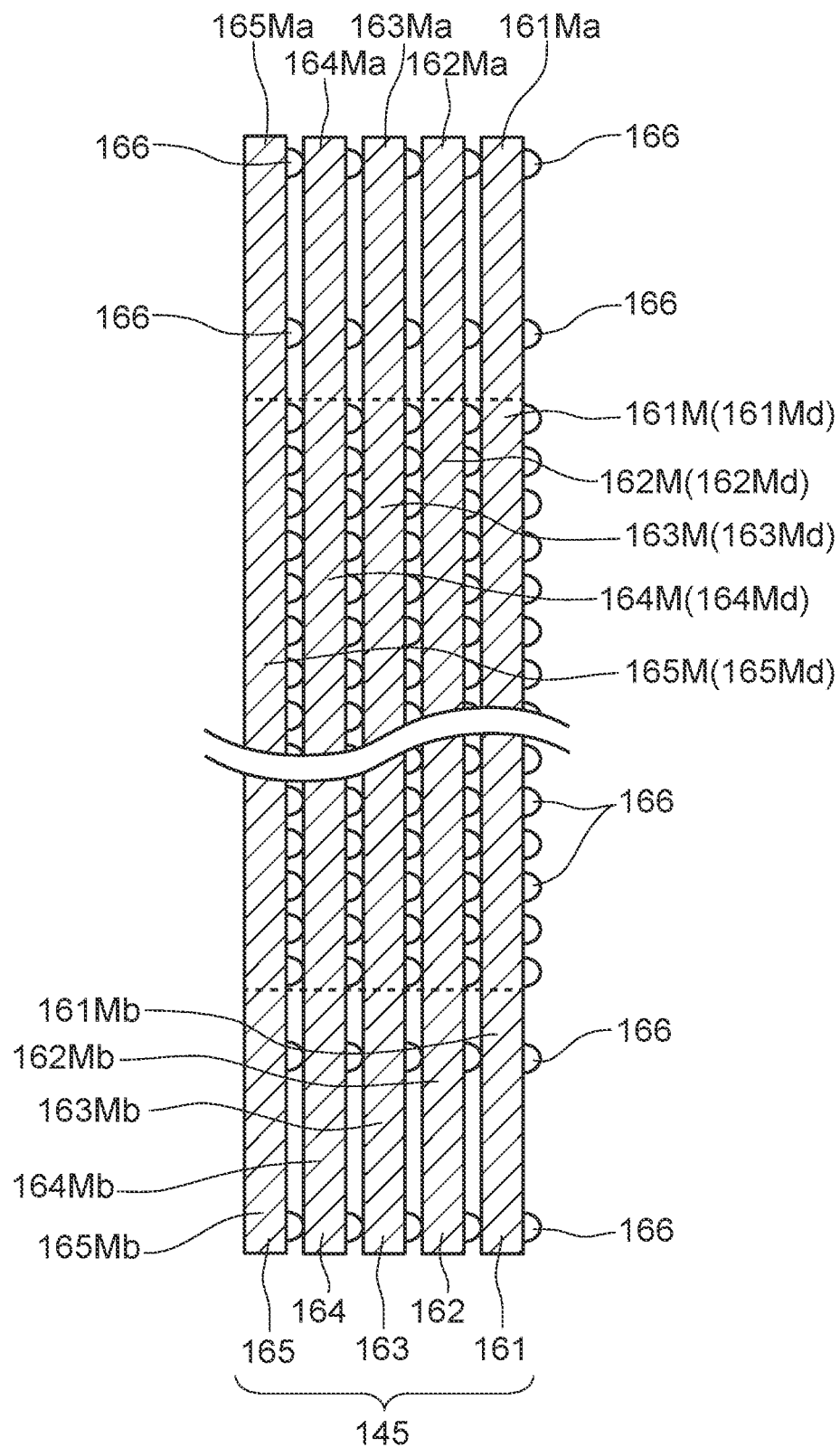
FIG. 13 is a sectional view taken along the line 13-13 in FIG. 10.
Figure 14:
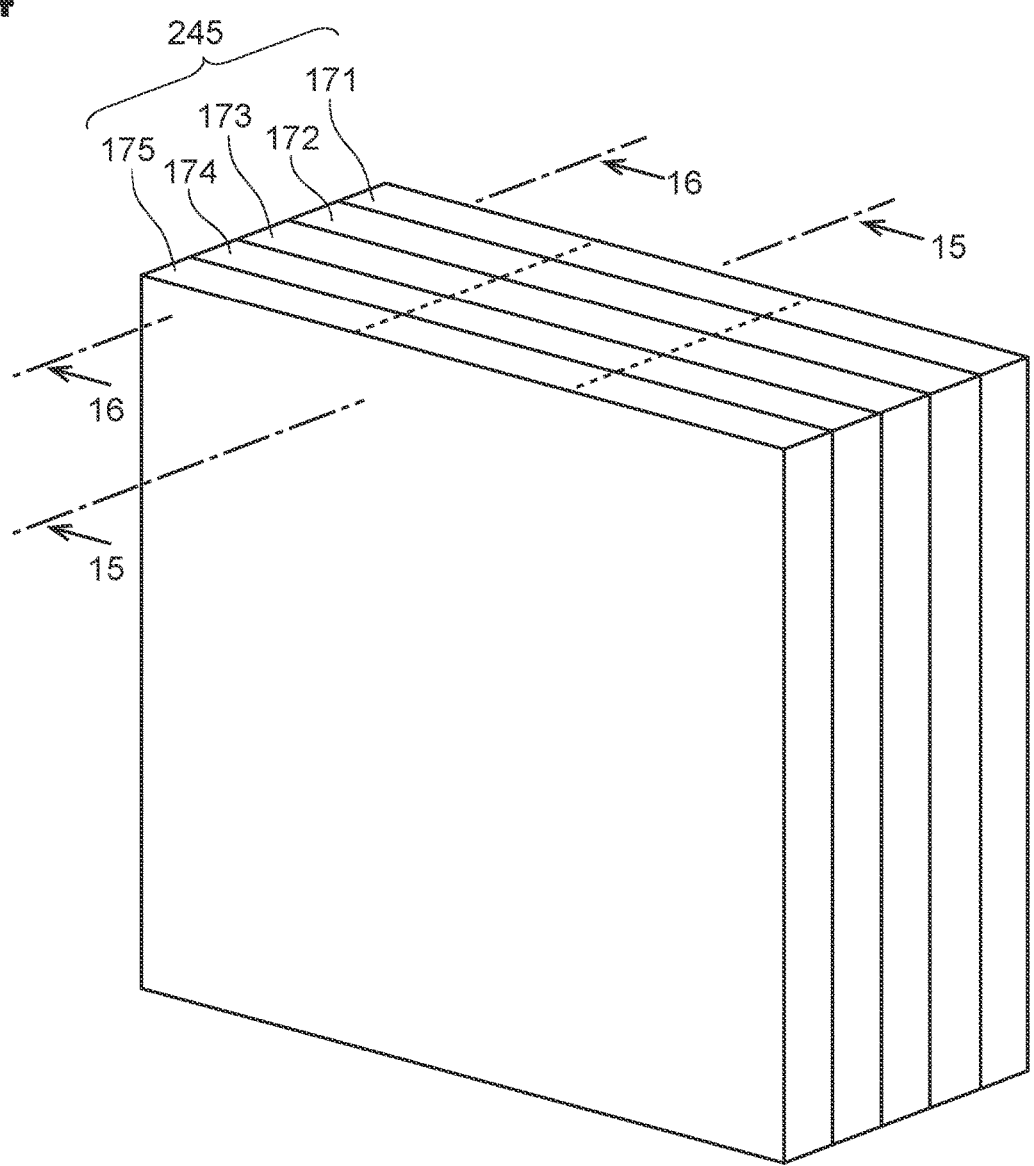
FIG. 14 is a perspective view showing the active layer according to the first modified example.

Subsequently, the light source-unit 360 will be explained with reference to FIG. 6 to FIG. 13, in addition to FIG. 1 to FIG. 5. Here, FIG. 6 is a perspective view showing the principal part of the light source-unit 360 which is used for the thermally assisted magnetic head 380. FIG. 7 is a perspective view showing the laser diode 130. FIG. 8 is a perspective view showing the laser diode 130 so as to clarify a stripe p-electrode 142 of the laser diode 130 and a stripe area 161M of an active layer 145. FIG. 9 is a perspective view showing an optical generating layer 150 being included in the laser diode 130. FIG. 10 is a perspective view showing the active layer 145 which is included in the optical generating layer 150. FIG. 11 is a perspective view showing the active layer 145, seen from a quantum dot layer 161. FIG. 12 is a sectional view taken along the line 12-12 in FIG. 10. FIG. 13 is a sectional view taken along the line 13-13 in FIG. 10.

As illustrated in FIG. 6, the light source-unit 360 includes the laser diode 130 and the sub-mount 350. The laser diode 130 is joined to the sub-mount 350 to constitute the light source-unit 360.

The laser diode 130 is joined to the sub-mount 350 with a later-described joining metal. Further, the laser diode 130 is joined to the sub-mount 350 so that the later-described stripe p-electrode 142 opposes to a later-described surface insulating layer 350a (a joint-surface 351) of the sub-mount 350. Therefore, a joint-metal layer 151 is formed between the stripe p-electrode 142 and the surface insulating layer 350a (a joint-surface 351).

As illustrated in FIG. 6, FIG. 7, the laser diode 130 has an n-substrate 140, a n-electrode 141, the optical generating layer 150, insulating layers 148a, 148b, a p-cladding layer 149 and the stripe p-electrode 142, having a straight band-like shape.

The stripe n-electrode 141 is joined to a surface on the outside of the n-substrate 140. Further, the optical generating layer 150 is formed on a side of the n-substrate 140 opposite to the stripe n-electrode 141, and the insulating layers 148a, 148b and the p-cladding layer 149 are formed on the optical generating layer 150. Further, the stripe p-electrode 142 is formed on the surface on the outside of the p-cladding layer 149. The p-cladding layer 149 is a part, having a straight band-like shape, and it is also called "stripe". The p-cladding layer 149 confines the injected current flow direction, and movements of electrons and holes, inside the laser diode 130.

As illustrated in FIG. 7, FIG. 9 in detail, the optical generating layer 150 includes the active layer 145, being a pn junction layer, an n-cladding layer 147 and a p-cladding layer 146. The optical generating layer 150 has a structure in which the active layer 145 is sandwiched between the n-cladding layer 147 and the p-cladding layer 146.

Then, as illustrated in FIG. 4, the laser diode 130 is joined to the sub-mount 350 so that the active layer 145 opposes to the core layer 25, and a laser light emitting part 145A of the active layer 145 (see FIG. 7) is arranged in a part, opposing to the core layer 25.

As described later, as illustrated in FIG. 10, because the active layer 145 includes five quantum dot layers 161 to 165, the five quantum dot layers 161 to 165, constituting the active layer 145, oppose to the core layer 25, in the thermally assisted magnetic head 380. Note that the laser light emitting part 145A is a part, of the laser diode 130, which a laser light L is emitted.

The sub-mount 350 is made of a silicon (Si), for example, and it is formed in a rectangular parallelepiped shape. As illustrated in FIG. 1, FIG. 6, the sub-mount 350 has a size larger than the laser diode 130. Further, the sub-mount 350 is able to be formed with semiconductor material such as GaAs, SiC or the like, or a ceramic material such as aluminum oxide-titanium carbide ($Al_2O_3.TiC$) or the like.

Then, as illustrated in FIG. 6 in detail, the sub-mount 350 has the surface insulating layer 350a made silicon dioxide ($SiO_2$). The surface of the surface insulating layer 350a constitutes the joint-surface 351 which the laser diode 130 is joined. The joint-surface 351 is formed in a flat rectangular shape. The joint-surface 351 has a size larger than the laser diode 130.

(Active Layer)

Next, the active layer 145 will be explained with reference to FIG. 10 to FIG. 13, in addition to FIG. 6 to FIG. 8.

As illustrated in FIG. 10, the active layer 145 includes the five quantum dot layers 161, 162, 163, 164, 165. The active layer 145 has a multi-layered structure which the five quantum dot layers 161 to 165 are stacked. The quantum dot layer 161 is arranged in a position, closest to the stripe p-electrode 142, and the quantum dot layer 165 is arranged in a position, closest to the n-electrode 141, among the quantum dot layers 161 to 165.

As illustrated in FIG. 11 to FIG. 13, a plurality of quantum dots 166 are formed in the respective quantum dot layers 161 to 165. The respective quantum dots 166 are particles made of semiconductor, having about several nm (nanometer) size. In the active layer 145, carriers (electrons or positive holes) are confined in minute areas of the quantum dots 166. Movements of the carriers are confined in the three-dimensional directions by the respective quantum dots 166.

As illustrated in FIG. 11, FIG. 13, the quantum dot layers 161 to 165 respectively include stripe-areas 161M, 162M, 163M, 164M, 165M. The stripe-areas 161M to 165M are areas, respectively having band-like shapes, being arranged in around the center of the respective quantum dot layers 161 to 165.

As illustrated in FIG. 8, the stripe-areas 161M to 165M are formed in the positions, corresponding to the stripe p-electrode 142, of the respective quantum dot layers 161 to 165. In FIG. 8, part of band-like shape, which dots are shown, is corresponding to the stripe-areas 161M to 165M.

Further, as illustrated in FIG. 11, FIG. 12, the outer areas than the stripe-areas 161M, 162M, 163M, 164M, 165M (the areas except for the stripe-areas 161M, 162M, 163M, 164M, 165M) are side-areas 161A, 162A, 163A, 164A, 165A, in the respective quantum dot layers 161, 162, 163, 164, 165.

Then, as illustrated in FIG. 11, FIG. 13, window-areas 161Ma, 161Mb, 162Ma, 162Mb, 163Ma, 163Mb, 164Ma, 164Mb, 165Ma, 165Mb are formed in the respective stripe-areas 161M, 162M, 163M, 164M, 165M. The window-areas 161Ma, 161Mb to 165Ma, 165Mb are areas, of the respective stripe-areas 161M to 165M, corresponding to the laser light emitting part 145A and areas of rear side (for example, rectangular area, illustrated in FIG. 11). Because the window-areas 161Ma to 165Ma are areas (front facets) corresponding to the laser light emitting part 145A, the laser light L is emitted from the window-areas 161Ma to 165Ma. The window-areas 161Mb to 165Mb are areas (rear facets), arranged rear side of the window-areas 161Ma to 165Ma, they are the areas where photons reflect inside the laser diode 130 without light emitting out.

In the active layer 145, the quantum dot layers 161 to 165 respectively include the window-areas 161Ma, 161Mb to 165Ma, 165Mb. Therefore, the quantum dot layers 161 to 165 correspond to window-formed quantum dot layers according to the present invention. The active layer 145 has a multi-layer structure which the window-formed quantum dot layers are stacked.

Then, in the active layer 145, the respective window-areas 161Ma, 161Mb to 165Ma, 165Mb are low-density areas, in the respective quantum dot layers 161 to 165. The low-density areas mean the areas which arrangement density of the quantum dots 166 are lower than the other areas. Concerning the arrangement density of the quantum dots 166, the respective window-areas 161Ma, 161Mb to 165Ma, 165Mb are lower than the areas except for the window-areas 161Ma, 161Mb to 165Ma, 165Mb. The arrangement density of the quantum dots 166 is able to be decided in accordance with the number of the arranged quantum dots 166 per unit area.

As illustrated in FIG. 11 to FIG. 13, in the side-areas 161A to 165A and middle areas 161Md, 162Md, 163Md, 164Md, 165Md, of the stripe-areas 161M to 165M, except for the window-areas 161Ma, 161Mb to 165Ma, 165Mb, a large number of quantum dots 166 are arranged and a large number of quantum dots 166 are congested. These areas are congested areas CR. On the other hand, in the window-areas 161Ma, 161Mb to 165Ma, 165Mb, quantum dots 166 are arranged discretely. Therefore, the window-areas 161Ma, 161Mb to 165Ma, 165Mb are discrete areas SR.

Here, FIG. 6, FIG. 7 are referred. The joint-metal layer 151 is formed with the joining metal. The joining metal is a metal which is used for joining the laser diode 130 and the sub-mount 350. In case of the light source-unit 360, for example, solder (alloy metal including tin), tin (Sn) and gold (Au) are able to be used as the joining metal. When tin (Sn) and gold (Au) are used as the joining metal, alloy layer, made of alloy (AuSn alloy) including tin and gold, and metal layer, including gold, are included in the joining metal layer 151.

(Operation and Effect of the Light Source-Unit)

As described above, as illustrated in FIG. 6, the laser diode 130 is joined to the sub-mount 350, thereby the light source-unit 360 is manufactured. As illustrated in FIG. 10, the active layer 145, of the laser diode 130 includes the five quantum dot layers 161 to 165, a plurality of quantum dots 166 are formed in the respective quantum dot layers 161 to 165, as illustrated in FIG. 11. The quantum dots 166 are semiconductor particles confining movements of the carriers (electrons or positive holes) in the three-dimensional directions.

In general, the structure, which the carriers are confined in the extremely narrow areas, is called a quantum well (QW). In the quantum well, movements of the carriers are confined in the one-dimensional direction. The quantum well, in this case, is constituted by a plane thin-film, made of semiconductor, having an extremely thin thickness.

By the way, in general, when the active layer changes from a bulk semiconductor to the quantum well, density of state, which shows the number of seats of carriers, changes. In the bulk semiconductor, density of state shows a continuous parabolic shape though, in the quantum well, density of state shows a step like shape. The peaks of light emission wavelength occur at the steps in step like shape, and width of light emission wavelength is narrowed. This point is a characteristic of the case which the active layer is the quantum well.

Then, the active layer 145, of the light source-unit 360 according to the embodiment, includes the quantum dot layers 161 to 165. The quantum dots 166 of the respective quantum dot layers 161 to 165 confine movements of the carriers in the three-dimensional directions. In case of the quantum well, dimension of quantization is one dimension though, in case of the active layer 145, because quantum dots 166 are formed in the respective quantum dot layers 161 to 165, dimension of quantization evolves into three dimensions Then, because dimension of quantization evolves into three dimensions from one dimension, in the active layer 145, density of state is more discrete than the quantum well in one dimension. Namely, in the active layer 145, existence of the carries is concentrated in specific energy states, because of including the quantum dots 166.

On the other hand, Fermi distribution function, which shows energy distribution of electrons, has temperature dependency, distribution of carriers varies in accordance with temperature. Therefore, the characteristic of the laser diode varies in accordance with temperature.

However, in case of the laser diode 130, because dimension of quantization evolves into three dimensions from one dimension, in the active layer 145, density of state is discretized, thereby existence of the carries is concentrated in the specific energy states. Thereby, even if Fermi distribution function varies in accordance with the change of temperature, density of state, being seats of carriers, is fixed in the specific energy positions.

Accordingly, in case of the laser diode 130 including the quantum dots 166, the effective carrier distribution hardly changes, even if temperature changes.

Thereby, in case of the laser diode 130, because variation of characteristics, in accordance with the change of temperature, hardly varies, the characteristic of temperature of the laser diode 130 is largely improved.

As described above, the active layer 145 includes the quantum dot layers 161 to 165, which the quantum dots 166 are respectively formed, thereby, the laser diode 130 is devised so as to be insensible to temperature.

Accordingly, the thermally assisted magnetic head 380, including the laser diode 130, is placed in the environment which change of temperature occurs easily, because of the generation of heat in accordance with the data recording action of the recording head 91, the generation of heat in accordance with light emission of the laser diode 130, however the mode hopping of the laser diode 130 is hard to occur. Therefore, the recording quality of the thermally assisted magnetic head 380 is difficult to be lowered, the recording quality is stable.

On the other hand, because the quantum dots 166 are respectively minute semiconductor particles, intensity of the laser light L, being obtained from the respective quantum dots 166, is extremely small.

However, a mass of quantum dots 166, constituted by the multi-layered structure including the quantum dot layers 161 to 165, is formed, in the laser diode 130. Thereby, light emission intensity of the laser light L, in the light source-unit 360, is enhanced.

Further, the respective quantum dot layers 161 to 165 includes the stripe-areas 161M to 165M, in accordance with the stripe p-electrode 142, in the light source-unit 360. Therefore, population inversion, which is necessary for stimulated emission, is formed along by the stripe-areas 161M to 165M, thereby the laser-light L is guided along by the stripe-areas 161M to 165M.

Then, because the low-density areas are formed in the respective stripe-areas 161M to 165M, in the light source-unit 360, the arrangement densities of the quantum dots 166 are partially lowered, in the respective stripe-areas 161M to 165M. Then, movements of the carriers, between the stripe p-electrode 142 and the n-electrode 141, are confined, absorption of the laser-light L is difficult to occur, in the stripe-areas 161M to 165M.

Moreover, the low-density areas are formed in the window-areas 161Ma, 161Mb to 165Ma, 165Mb of the stripe-areas 161M to 165M. Therefore, when the laser light L, generated inside the stripe-areas 161M to 165M, is emitted from the laser light emission part 145A, absorption of the laser-light L is also difficult to occur. Accordingly, in the active layer 145, the laser-light L is effectively emitted to outside. Thereby power consumption, in the light source-unit 360, is reduced. Further, the heat phenomena due to light absorption at the edge of the laser diode 130 can be suppressed, thereby the lifetime of the laser diode 130 can be improved.

Furthermore, the light source-unit 360 has the multi-layered structure which the quantum dot layers 161 to 165, as the window-formed quantum dot layers, are stacked. Therefore, both light emission intensity of the laser light L improving function by the multi-layered structure, and absorption of the laser light L lowering function by the window-formed structure are provided in the light source-unit 360.

First Modified Example

Next, the thermally assisted magnetic head and the light source-unit, according to the first modified example, will be explained with reference to FIG. 14 to FIG. 18. The thermally assisted magnetic head and the light source-unit, according to the first modified example, are respectively different in the active layer of the laser diode 130, as compared with the above-described thermally assisted magnetic head 380, the light source-unit 360. Namely, in case of the above-described thermally assisted magnetic head 380, the light source-unit 360, the laser diode 130 includes the active layer 145. On the other hand, in case of the thermally assisted magnetic head, the light source-unit, according to the first modified example, the laser diode includes an active layer 245, illustrated in FIG. 14 to FIG. 17.

The active layer 145 includes the five quantum dot layers 161, 162, 163, 164, 165. To the contrary, the active layer 245 includes the five quantum dot layers 171, 172, 173, 174, 175. The active layer 245 has the multi-layered structure which the five quantum dot layers 171 to 175 are stacked, similar with the active layer 145.

Further, as illustrated in FIG. 15 to FIG. 18, a plurality of quantum dots 166 are formed in the respective quantum dot layers 171 to 175, similar with the quantum dot layers 161 to 165.

However, the quantum dot layers 171 to 175 are respectively different in distribution of a plurality of quantum dots 166, as compared with the quantum dot layers 161 to 165.

Figure 15:
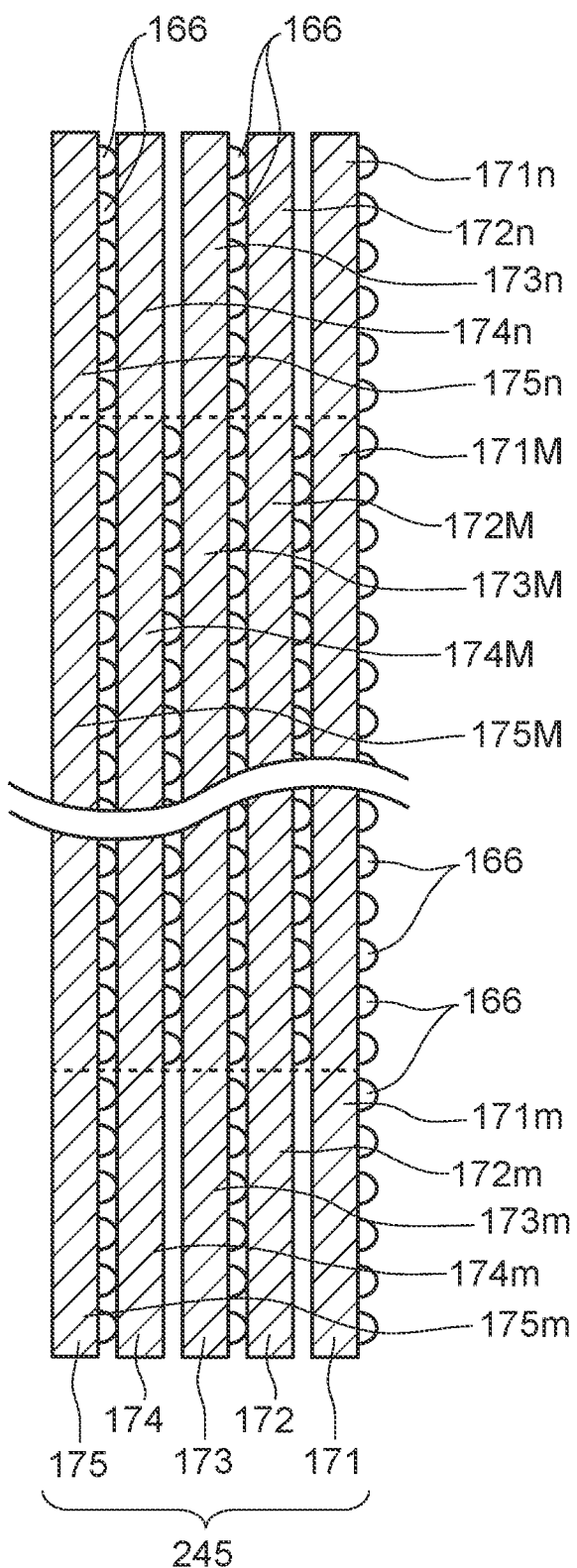
FIG. 15 is a sectional view taken along the line 15-15 in FIG. 14.

As illustrated in FIG. 15, in case of the active layer 245, the quantum dot layers 171, 173, 175 are even dot layers, the quantum dot layers 172, 174 are uneven dot layers. Namely, a plurality of quantum dots 166 are formed evenly in the almost whole of the respective quantum dot layers 171, 173, 175. To the contrary, the quantum dot layers 172, 174 are respectively include non-dot areas, in which the quantum dots 166 are not formed (the area illustrated by "nQD" in FIG. 18).

Then, as illustrated in FIG. 15, in case of the active layer 245, the quantum dot layers 171, 173, 175, being even dot layers, and the quantum dot layers 172, 174, being uneven dot layers, are alternately stacked.

Figure 16:
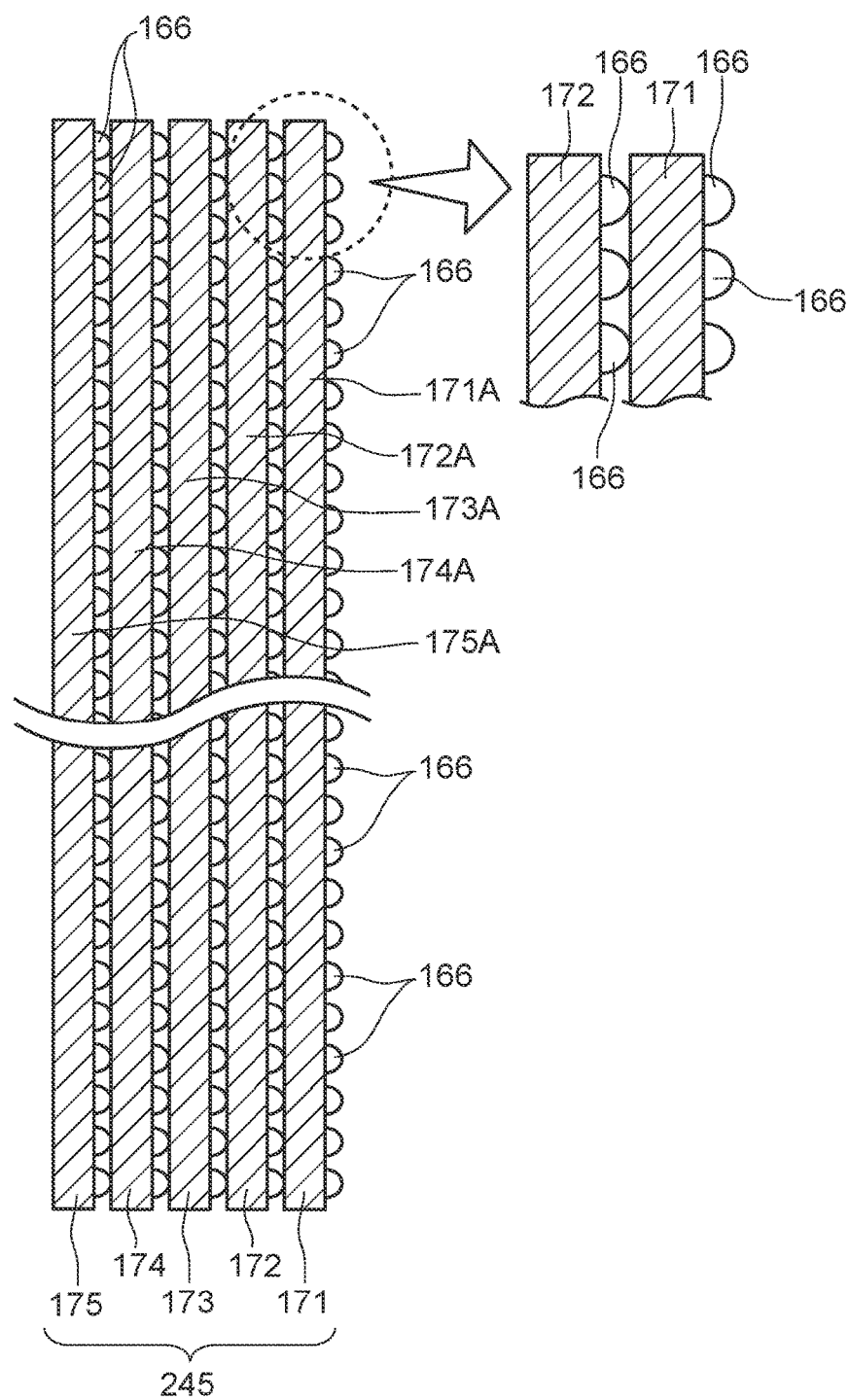
FIG. 16 is a sectional view taken along the line 16-16 in FIG. 14.
Figure 17:
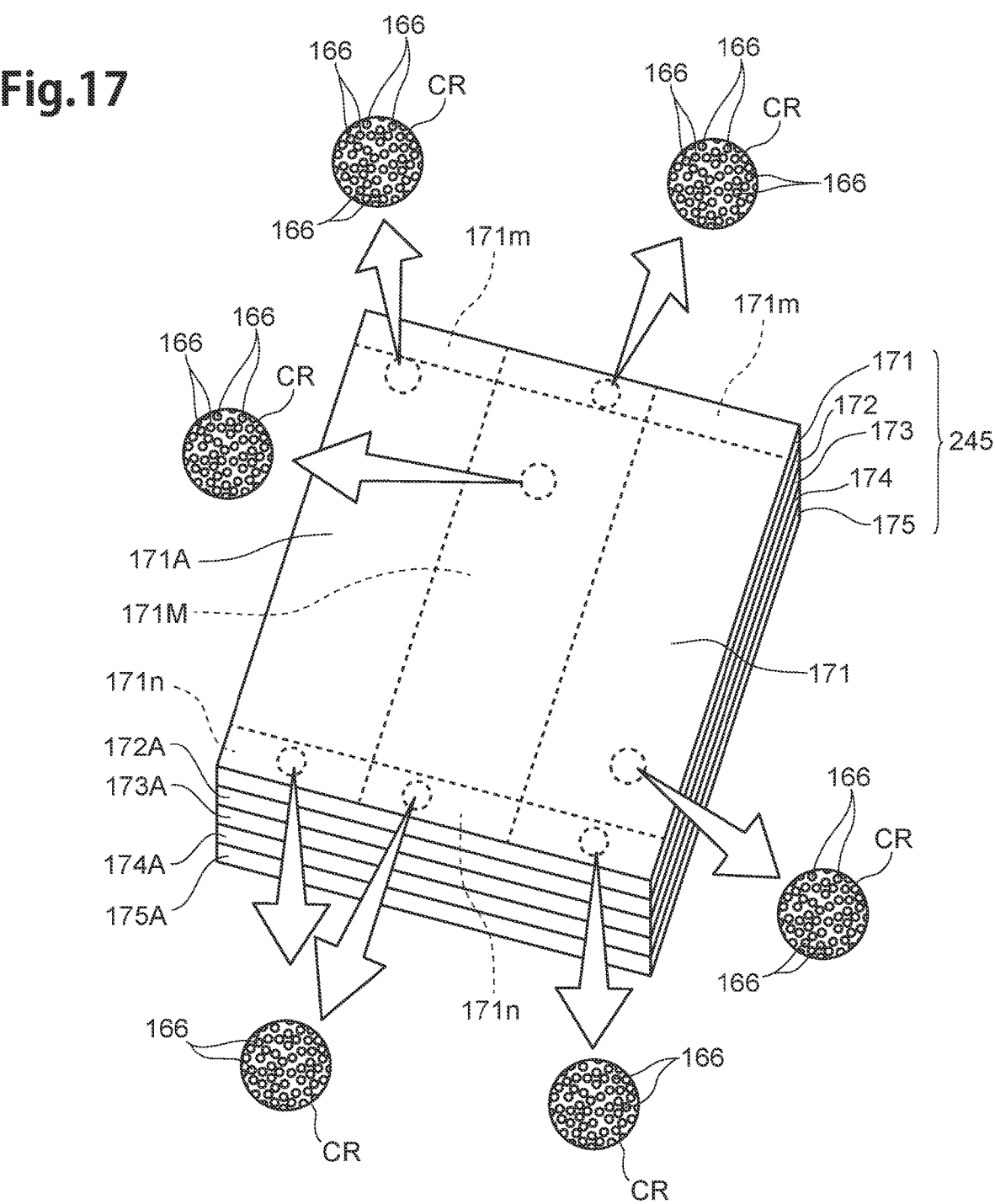
FIG. 17 is a perspective view showing the active layer, according to the first modified example, seen from a first layered quantum dot layer.

The quantum dot layers 171, 173, 175, as illustrated in FIG. 15 to FIG. 17, respectively include stripe-areas 171M, 173M, 175M and side-areas 171A, 173A, 175A. Further, the quantum dot layers 171, 173, 175 respectively include window-areas 171m, 171n, 173m, 173n, 175m, 175n.

In case of the above-described active layer 145, the window-areas 161Ma, 161Mb to 165Ma, 165Mb are discrete areas SR. However, in case of the quantum dot layers 171, 173, 175, all of the stripe-areas 171M, 173M, 175M, side-areas 171A, 173A, 175A and window-areas 171m, 171n, 173m, 173n, 175m, 175n are congested areas CR. Note that the window-areas 171m, 171n, 173m, 173n, 175m, 175n are areas, of the respective quantum dot layers 171, 173, 175, corresponding to the laser light emitting part 145A and areas of rear side (the window-areas 171m, 171n are illustrated in FIG. 17).

Figure 18:
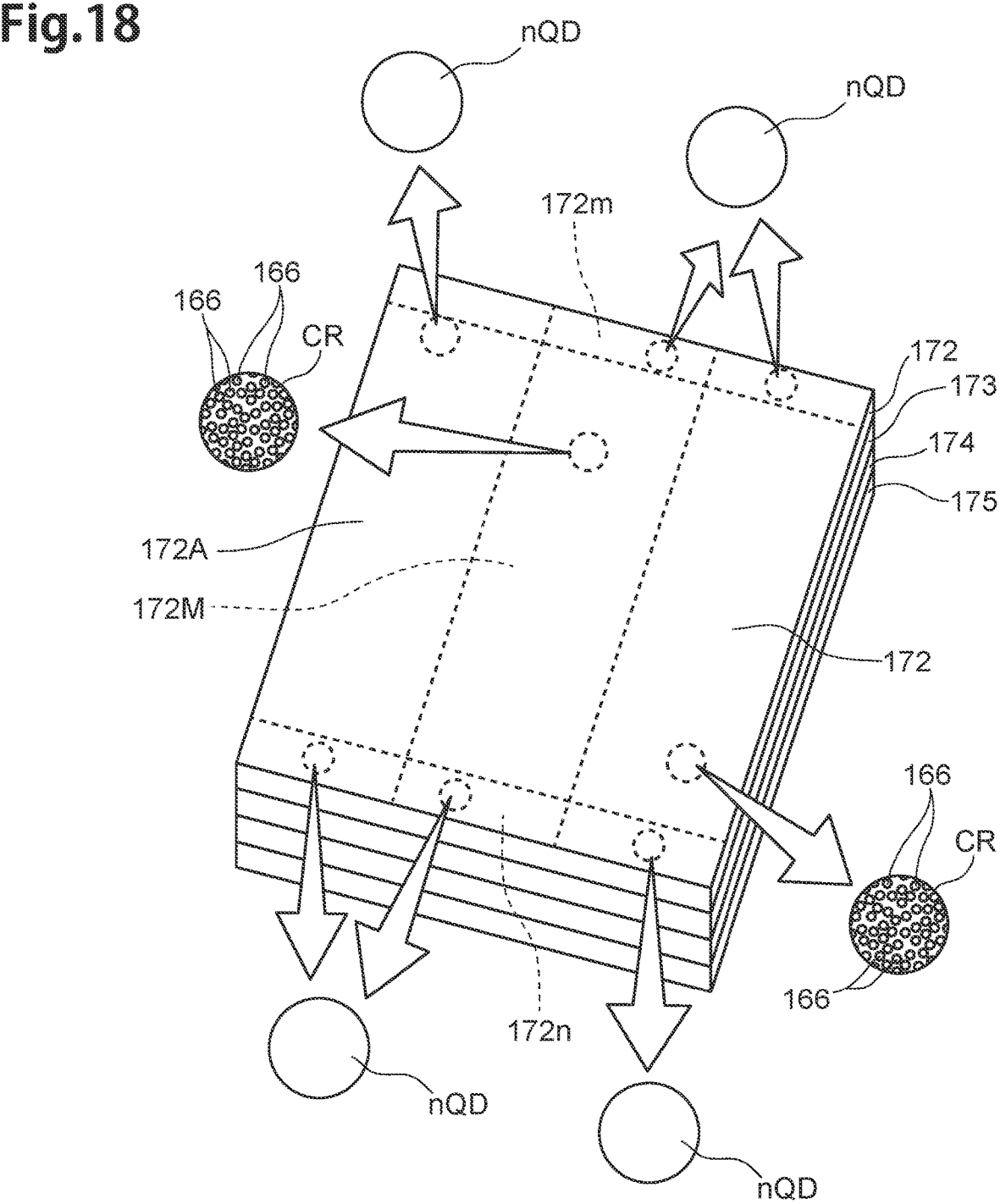
FIG. 18 is a perspective view showing the active layer, according to the first modified example, mainly showing the second layered quantum dot layer.
Figure 19:
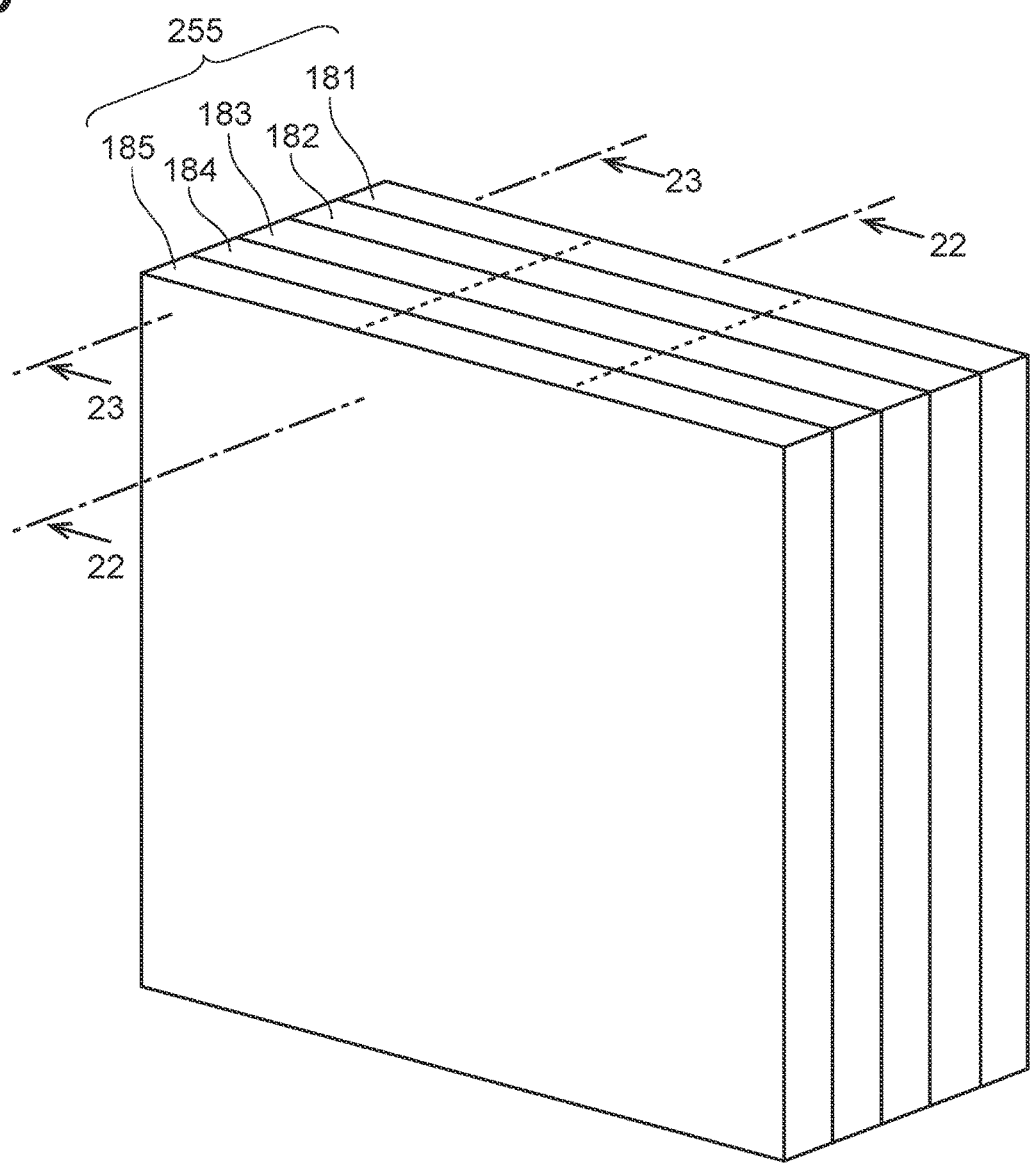
FIG. 19 is a perspective view showing the active layer according to the second modified example.

The quantum dot layers 172, 174, as illustrated in FIG. 15, FIG. 16, FIG. 18, respectively include stripe-areas 172M, 174M and side-areas 172A, 174A. Further, the quantum dot layers 172, 174 respectively include window-areas 172m, 172n, 174m, 174n.

Then, the above-described active layer 145 includes the window-areas 161Ma, 161Mb to 165Ma, 165Mb, being discrete areas SR, as the low-density areas.

However, the active layer 245 includes the window-areas 172m, 172n, 174m, 174n, being non-dot areas nQD, as the low-density areas. The window-areas 172m, 172n, 174m, 174n are non-dot areas nQD, because of not including the quantum dots 166 though, they are low-density areas, because arrangement densities of the quantum dots 166 are lower than the other areas.

As described above, the active layer 245 includes a plurality of quantum dots 166, similar with the active layer 145. Therefore, the laser diode (not illustrated), including the active layer 245, is devised so as to be insensible to temperature, similar with the laser diode 130, including the active layer 145. Therefore, in case of the thermally assisted magnetic head including the active layer 245, the recording quality is also stable, without lowering, similar with the thermally assisted magnetic head 380 including the active layer 145.

Further, the active layer 245 includes the multi-layered structure being formed by the quantum dot layers 171 to 175, similar with the active layer 145. Therefore, light emission intensity of the laser light L, in the light source-unit including the active layer 245, is enhanced.

Furthermore, the active layer 245 includes the stripe-areas 171M to 175M, similar with the active layer 145, as illustrated in FIG. 18, parts of the stripe-areas 172M, 174M (window-areas 172m, 172n, 174m, 174n) are non-dot areas nQD. Therefore, movements of the carriers, between the stripe p-electrode 142 and the n-electrode 141, are confined, absorptions of the generated laser-light L are hard to occur, in the stripe-areas 172M, 174M. Therefore, the laser-light L is effectively generated in the active layer 245 as a whole. Thereby, power consumption, in the light source-unit including the active layer 245, is reduced.

Further, because the window-areas 172m, 172n, 174m, 174n are non-dot areas nQD, absorption of the laser-light L is hard to occur, in the window-areas 172m, 172n, 174m, 174n. Therefore, when the laser light L is emitted from the laser light emission part 145A of the active layer 245, absorption of the laser-light L is also hard to occur. Accordingly, in the light source-unit including the active layer 245, the laser-light L is effectively emitted, power consumption is more reduced. Further, the heat phenomena due to light absorption at the edge of the laser diode 130 can be suppressed, thereby the lifetime of the laser diode 130 can be improved.

Second Modified Example

Next, the thermally assisted magnetic head and the light source-unit, according to the second modified example, will be explained with reference to FIG. 19 to FIG. 23. The thermally assisted magnetic head and the light source-unit, according to the second modified example, are respectively different in the active layer of the laser diode 130, as compared with the above-described thermally assisted magnetic head 380, the light source-unit 360. Namely, in case of the above-described thermally assisted magnetic head 380, the light source-unit 360, the laser diode 130 includes the active layer 145. On the other hand, in case of the thermally assisted magnetic head, the light source-unit, according to the second modified example, the laser diode includes an active layer 255, illustrated in FIG. 19 to FIG. 23.

The above-described active layer 145 includes the five quantum dot layers 161 to 165. To the contrary, the active layer 255 includes the five quantum dot layers 181, 182, 183, 184, 185. The active layer 255 has the multi-layered structure which the five quantum dot layers 181 to 185 are stacked, similar with the active layer 145.

Further, as illustrated in FIG. 20 to FIG. 23, a plurality of quantum dots 166 are formed in the respective quantum dot layers 181 to 185, similar with the quantum dot layers 161 to 165.

However, the quantum dot layers 181 to 185 are respectively different in distribution of a plurality of quantum dots 166, as compared with the quantum dot layers 161 to 165.

Figure 21:
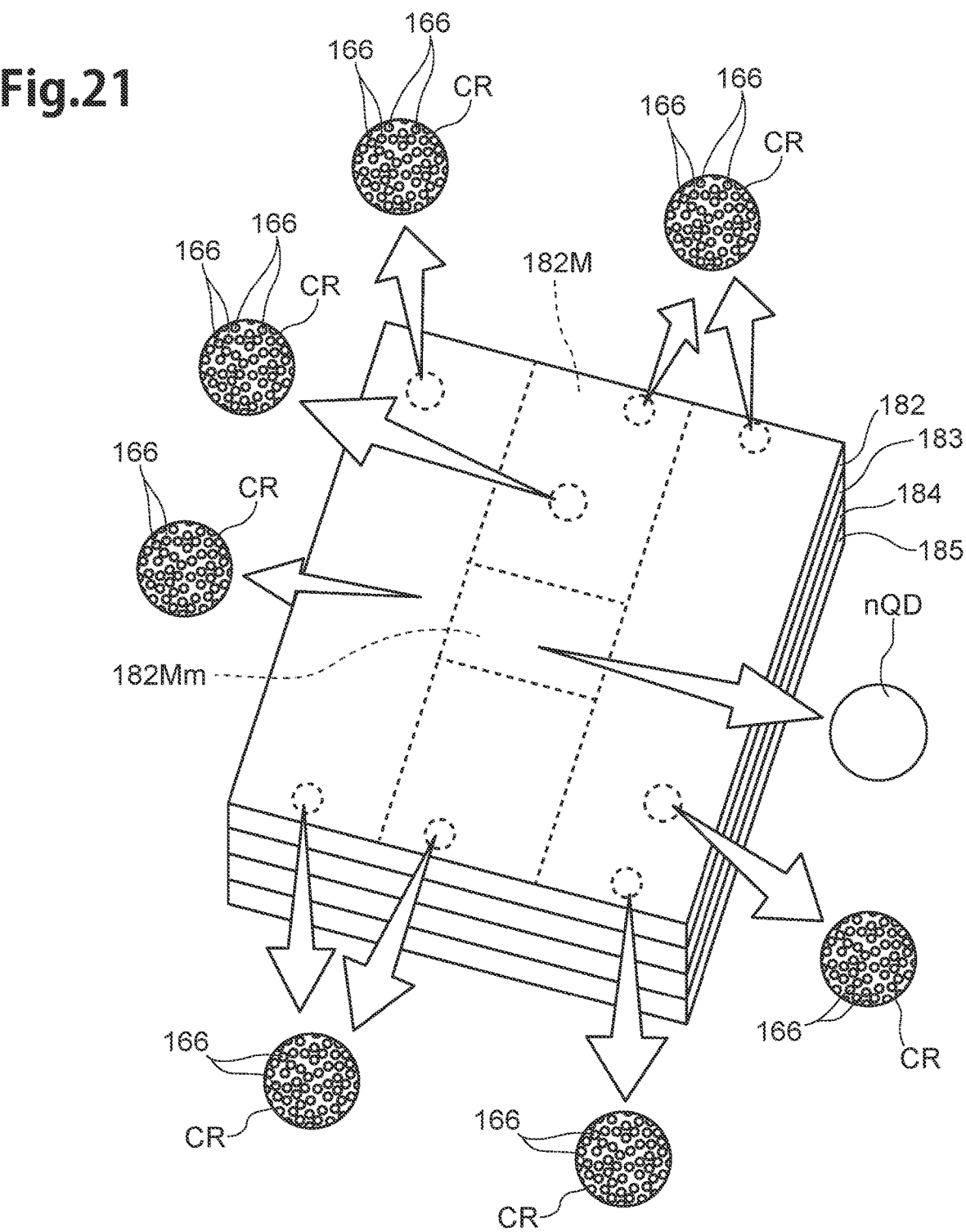
FIG. 21 is a perspective view showing the active layer, according to the second modified example, mainly showing the second layered quantum dot layer.
Figure 22:
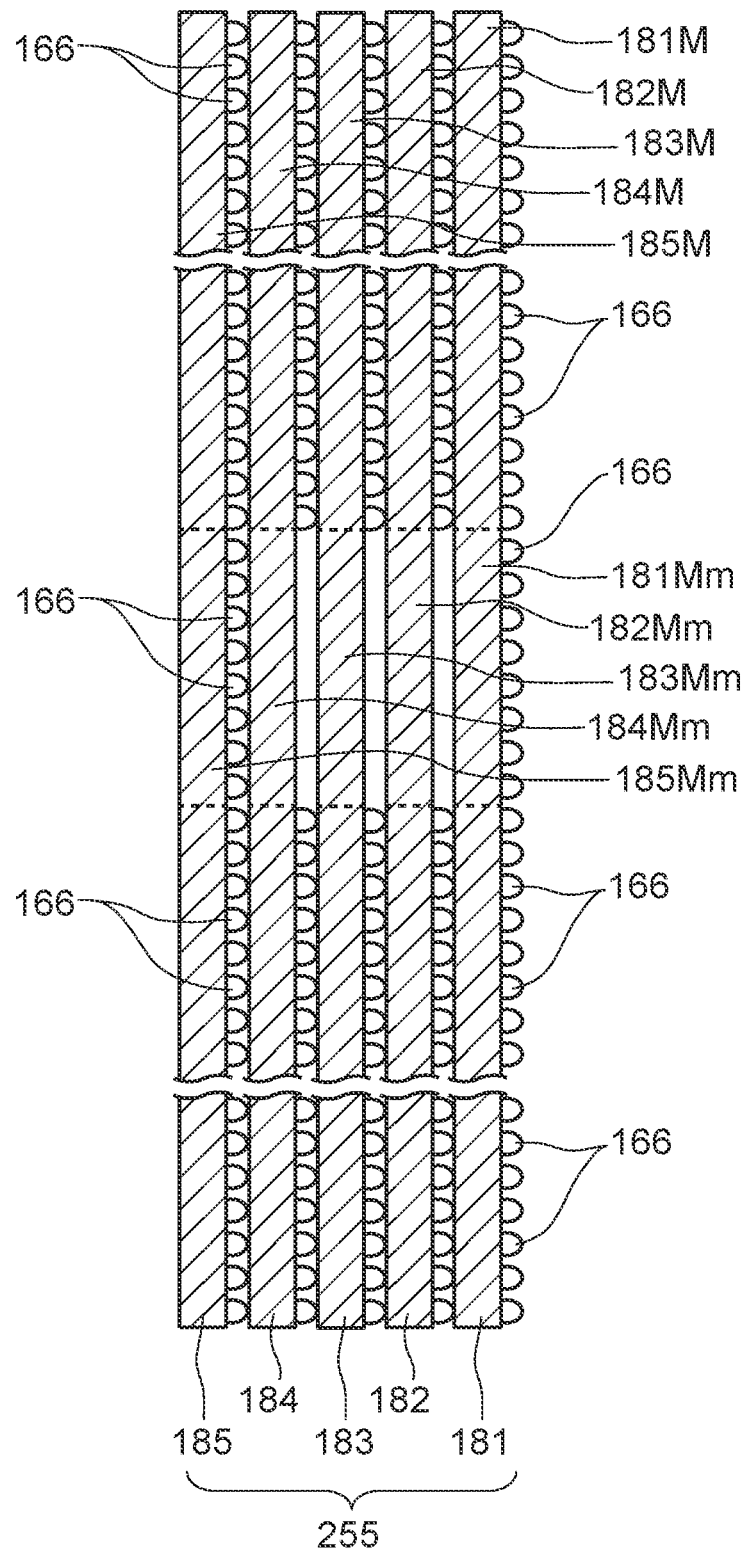
FIG. 22 is a sectional view taken along the line 22-22 in FIG. 19.
Figure 23:
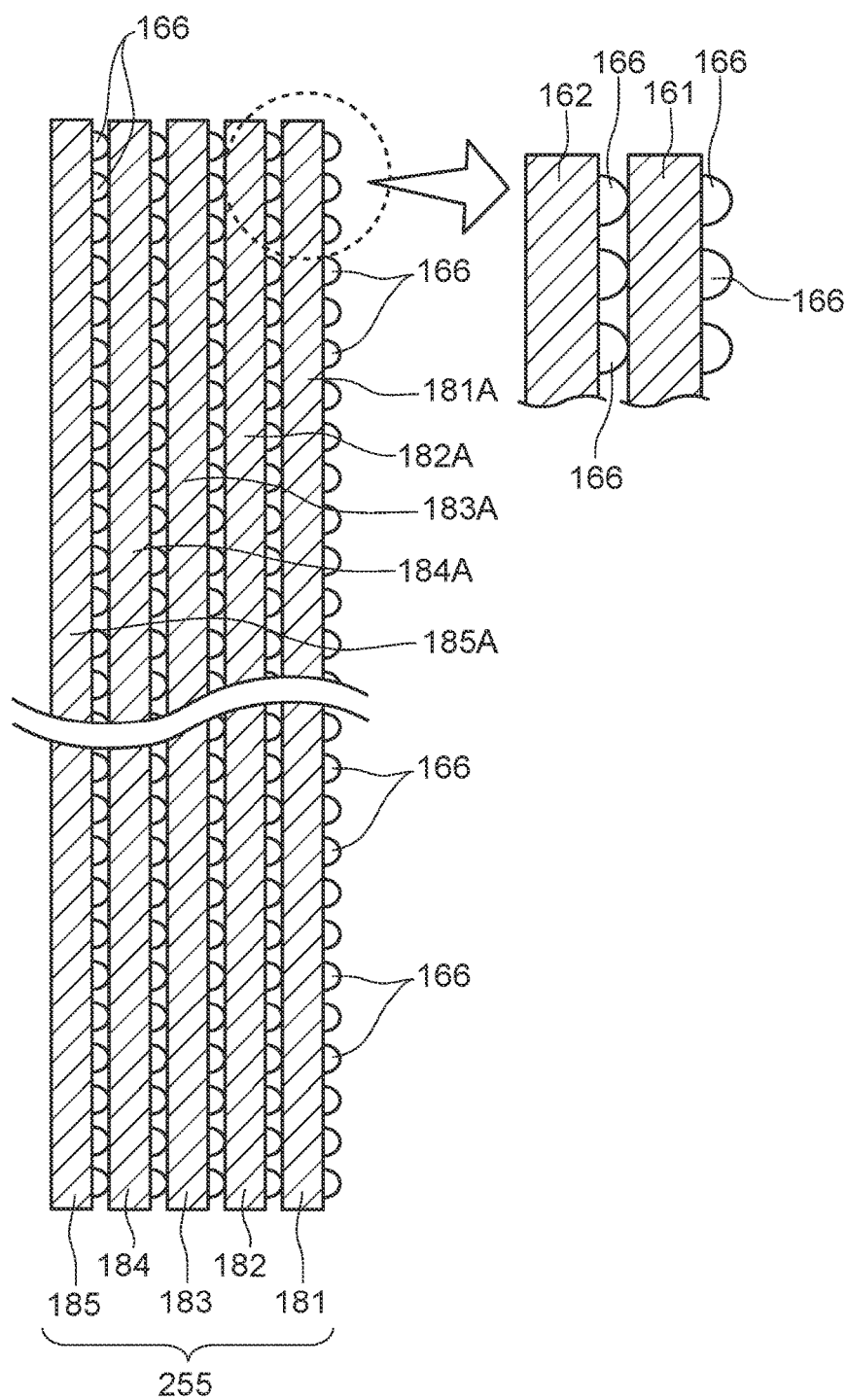
FIG. 23 is a sectional view taken along the line 23-23 in FIG. 19.
Figure 24:
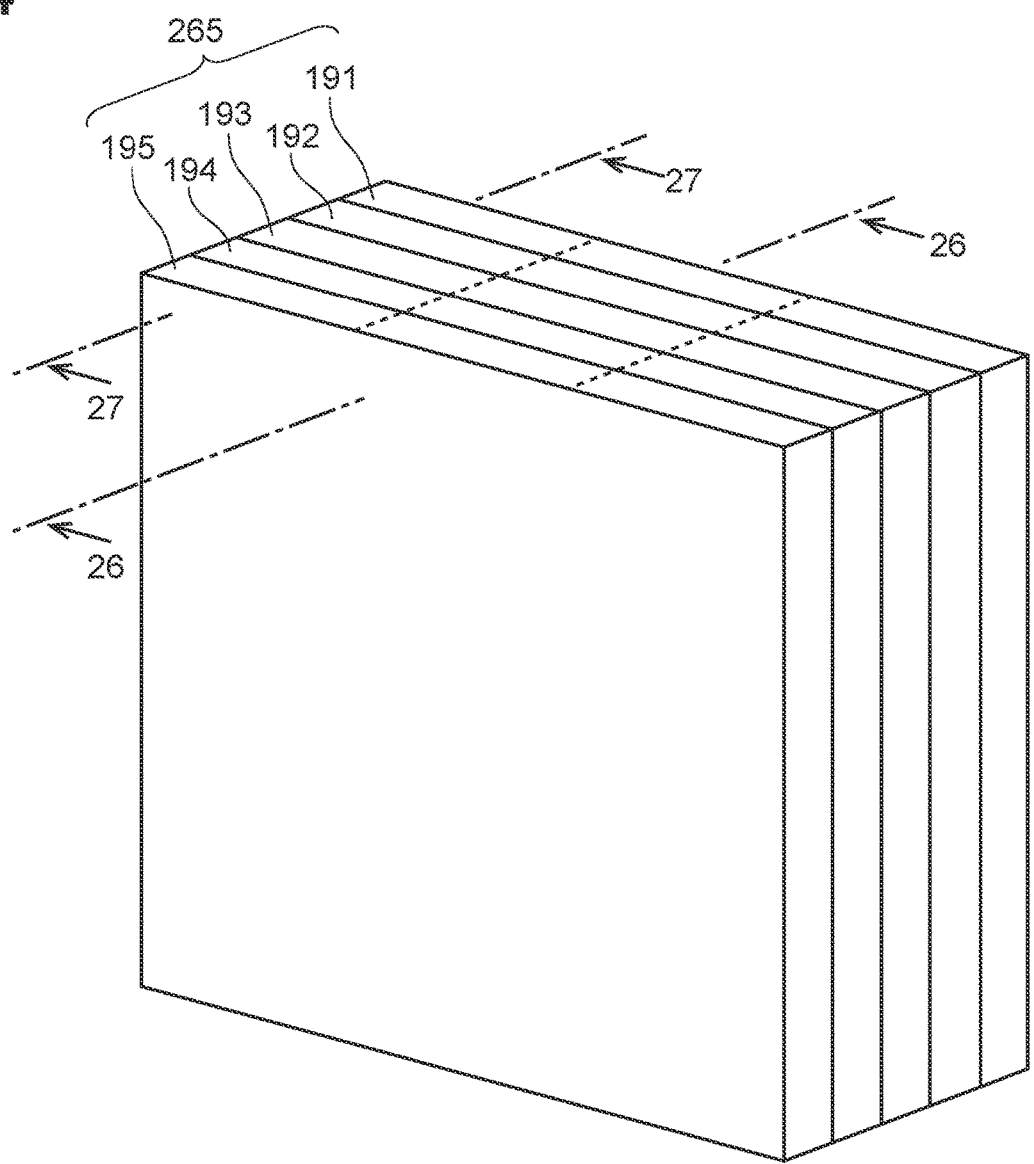
FIG. 24 is a perspective view showing the active layer according to the third modified example.

As illustrated in FIG. 22, in case of the active layer 255, the quantum dot layers 181, 185 are even dot layers, the quantum dot layers 182, 183, 184 are uneven dot layers. Namely, a plurality of quantum dots 166 are formed in almost the whole of the respective quantum dot layers 181, 185. To the contrary, the quantum dot layers 182, 183, 184 are respectively include non-dot areas, in which the quantum dots 166 are not formed (the area illustrated by "nQD" in FIG. 21).

Then, in case of the active layer 255, the quantum dot layers 181, 185, being even dot layers, are stacked so as to sandwich the quantum dot layers 182 to 184, being uneven dot layers.

Figure 20:
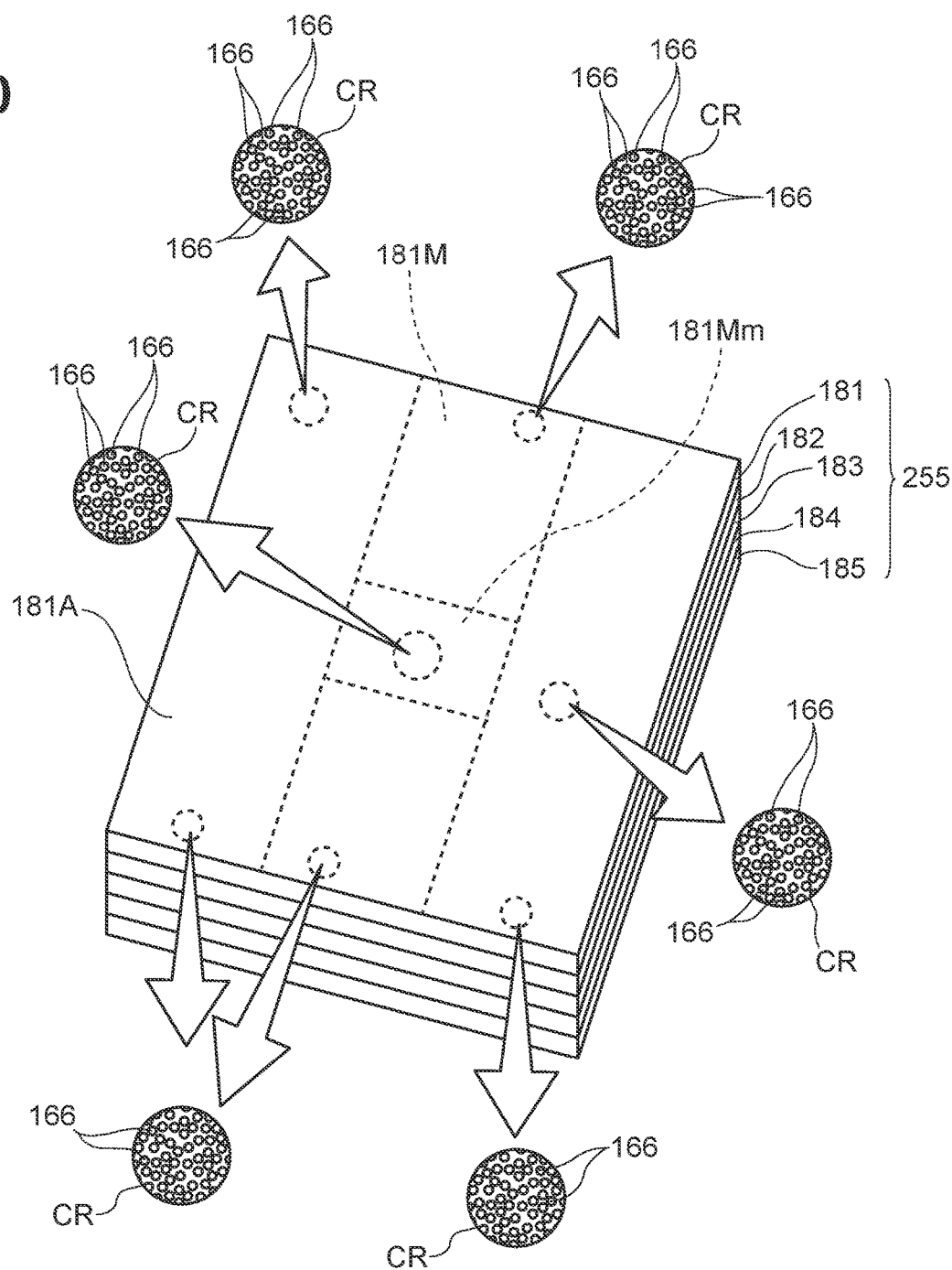
FIG. 20 is a perspective view showing the active layer, according to the second modified example, seen from the first layered quantum dot layer.

The quantum dot layers 181, 182, 183, 184, 185, as illustrated in FIG. 20, FIG. 22, respectively include stripe-areas 181M, 182M, 183M, 184M, 185M and side-areas 181A, 182A, 183A, 184A, 185A. Further, stripe-areas 181M, 182M, 183M, 184M, 185M include respectively center-areas 181Mm, 182Mm, 183Mm, 184Mm, 185Mm, and the center-areas 182Mm, 183Mm, 184Mm are formed in the non-dot areas nQD.

Then, the above-described active layer 145 include the window-areas 161Ma, 161Mb to 165Ma, 165Mb, being discrete areas SR.

However, in case of the quantum dot layers 181, 185, all areas including the stripe-areas 181M, 185M and side-areas 181A, 185A are congested areas CR. In case of the quantum dot layers 181, 185, all areas are congested areas CR.

Further, in case of the quantum dot layers 182,183,184, the center-areas 182Mm, 183Mm, 184Mm are formed in the non-dot areas nQD.

Then, in case of the above-described active layer 145, the five quantum dot layers 161 to 165 respectively includes the window-areas 161Ma, 161Mb to 165Ma, 165Mb, being discrete areas SR, as the low-density areas.

To the contrary, as illustrated in FIG. 22, in case of the active layer 255, the quantum dot layers 182, 183, 184, of the five quantum dot layers 181 to 185, includes the center-areas 182Mm, 183Mm, 184Mm, being the non-dot areas nQD, as the low-density areas.

As described above, the active layer 255 includes a plurality of quantum dots 166, similar with the active layer 145. Therefore, the laser diode (not illustrated), including the active layer 255, is devised so as to be insensible to temperature, similar with the laser diode 130, including the active layer 145. Therefore, in case of the thermally assisted magnetic head including the active layer 255, the recording quality is also stable, without lowering, similar with the thermally assisted magnetic head 380 including the active layer 145.

Further, the active layer 255 includes the multi-layered structure being formed by the quantum dot layers 181 to 185, similar with the active layer 145. Therefore, light emission intensity of the laser light L, in the light source-unit including the active layer 255, is enhanced.

Further, the active layer 255 include the stripe-areas 181M to 185M, similar with the active layer 145, as illustrated in FIG. 21, parts of the stripe-areas 182M, 183M, 184M are the non-dot areas nQD. Therefore, movements of the carriers, between the stripe p-electrode 142 and the n-electrode 141, are confined, absorptions of the laser-light L are hard to occur, in the stripe-areas 182M to 184M. Therefore, the laser-light L is effectively generated in the active layer 255 as a whole. Thereby, power consumption, in the light source-unit including the active layer 255, is reduced. Further, by controlling the size and location of the non-dot areas nQD, the laser beam shape can be controlled.

Third Modified Example

Next, the thermally assisted magnetic head and the light source-unit, according to the third modified example, will be explained with reference to FIG. 24 to FIG. 27. The thermally assisted magnetic head and the light source-unit, according to the third modified example, are respectively different in the active layer of the laser diode 130, as compared with the above-described thermally assisted magnetic head 380, the light source-unit 360. Namely, in case of the above-described thermally assisted magnetic head 380, the light source-unit 360, the laser diode 130 includes the active layer 145. On the other hand, in case of the thermally assisted magnetic head, the light source-unit, according to the third modified example, the laser diode includes an active layer 265, illustrated in FIG. 24 to FIG. 27.

The above-described active layer 145 includes the five quantum dot layers 161 to 165. To the contrary, the active layer 265 includes the five quantum dot layers 191, 192, 193, 194, 195. The active layer 265 has the multi-layered structure which the five quantum dot layers 191 to 195 are stacked, similar with the active layer 145.

Figure 25:
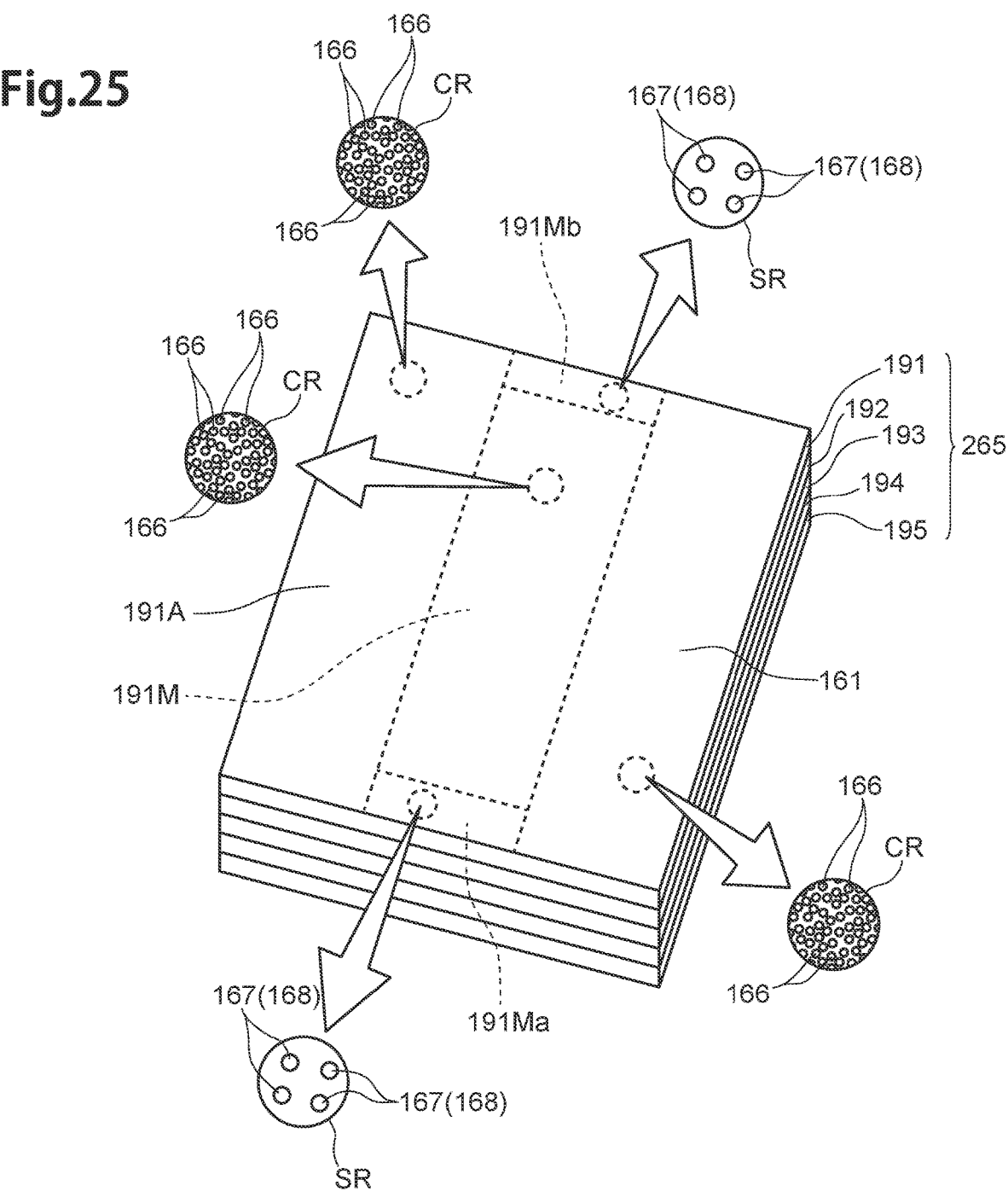
FIG. 25 is a perspective view showing the active layer, according to the third modified example, seen from the first layered quantum dot layer.
Figure 26:
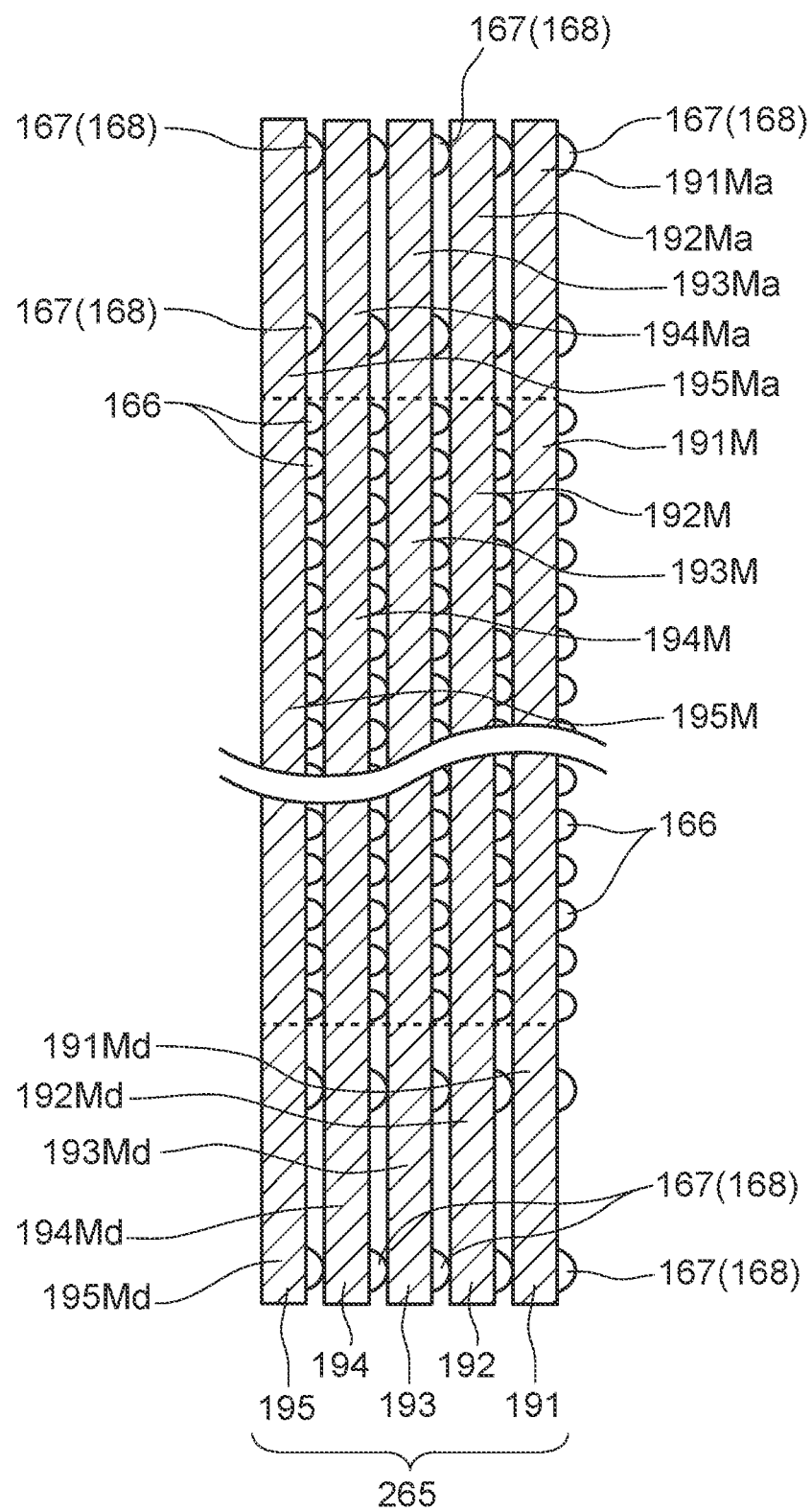
FIG. 26 is a sectional view taken along the line 26-26 in FIG. 24.
Figure 27:
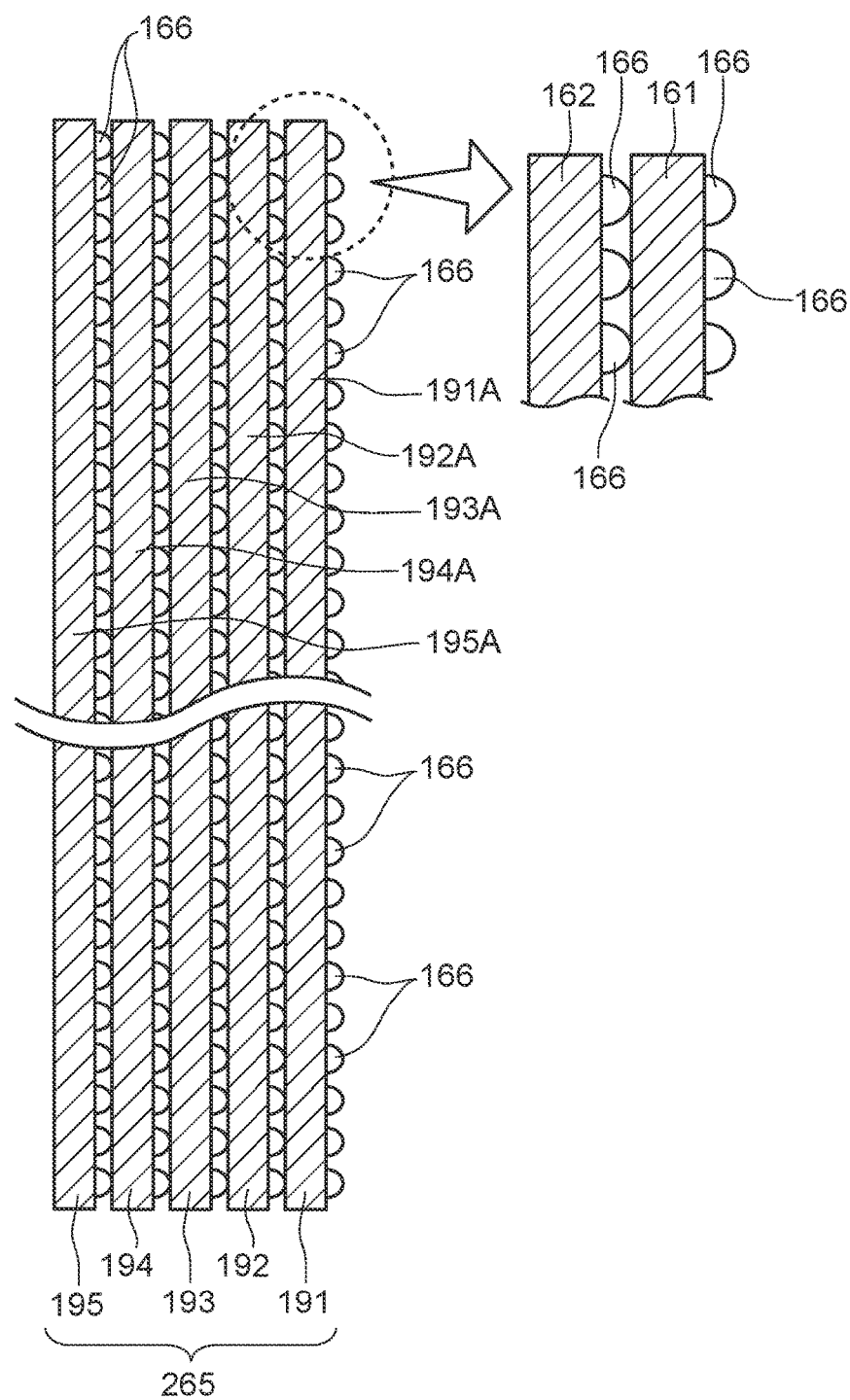
FIG. 27 is a sectional view taken along the line 27-27 in FIG. 24.

Further, as illustrated in FIG. 25 to FIG. 27, a plurality of quantum dots 166 are formed in the respective quantum dot layers 191 to 195, similar with the quantum dot layers 161 to 165. Further, the quantum dot layers 191 to 195 include a later-described window-areas 191Ma, 191Mb to 195Ma, 195Mb, a later-described quantum dots 167 are formed in the respective window-areas 191Ma, 191Mb to 195Ma, 195Mb.

The quantum dot layers 191 to 195, as illustrated in FIG. 25, FIG. 26, respectively include stripe-areas 191M, 192M, 193M, 194M, 195M and side-areas 191A, 192A, 193A, 194A, 195A.

Then, as illustrated in FIG. 25, FIG. 26, the window-areas 191Ma, 191Mb, 192Ma, 192Mb, 193Ma, 193Mb, 194Ma, 194Mb, 195Ma, 195Mb are formed in the respective stripe-areas 191M, 192M, 193M, 194M, 195M.

The quantum dots 167 are arranged discretely in the respective window-areas 191Ma, 191Mb to 195Ma, 195Mb. The respective window-areas 191Ma, 191Mb to 195Ma, 195Mb are discrete areas SR, similar with the window-areas 161Ma, 161Mb to 165Ma, 165Mb, and they are respectively low-density areas.

The quantum dots 167 have larger sizes than the quantum dots 166. Further, a later-described quantum dots 168 are able to be formed in the respective window-areas 191Ma, 191Mb to 195Ma, 195Mb instead of the quantum dots 167.

Because the quantum dots 167 have sizes larger than the quantum dots 166, the respective quantum dot layers 191 to 195 have size different structures.

As described above, the active layer 265 includes a plurality of quantum dots 166, similar with the active layer 145. Therefore, the laser diode (not illustrated), including the active layer 265, is devised so as to be insensible to temperature, similar with the laser diode 130, including the active layer 145. Therefore, in case of the thermally assisted magnetic head including the active layer 265, the recording quality is also stable, without lowering, similar with the thermally assisted magnetic head 380 including the active layer 145.

Further, the active layer 265 includes the multi-layered structure being formed by the quantum dot layers 191 to 195, similar with the active layer 145. Therefore, light emission intensity of the laser light L, in the light source-unit including the active layer 265, is enhanced.

Because parts of the stripe-areas 191M to 195M (the window-areas 191Ma, 191Mb to 195Ma, 195Mb) are the low-density areas, absorptions of the laser-light L are hard to occur, in the stripe-areas 191M to 195M. Further, the heat phenomena due to light absorption at the edge of the laser diode 130 can be suppressed, thereby the lifetime of the laser diode 130 can be improved.

Moreover, the low-density areas are formed in the window-areas 191Ma, 191Mb to 195Ma, 195Mb of the stripe-areas 191M to 195M. Therefore, when the laser light L, generated inside the stripe-areas 191M to 195M, is emitted from the laser light emission part 145A, absorption of the laser-light L is also hard to occur.

Further, because the quantum dots 167, which are formed in the window-areas 191Ma, 191Mb to 195Ma, 195Mb, have sizes larger than the quantum dots 166, this makes band gap energy large. Therefore, absorptions of the laser-light L, generated inside the active layer 265, are lowered in the window-areas 191Ma, 191Mb to 195Ma, 195Mb, thereby laser diode life time is extended.

On the other hand, the quantum dots 168 are respectively different in composition, as compared with the quantum dots 166. When the quantum dots 168 are formed in the window-areas 191Ma, 191Mb to 195Ma, 195Mb, the quantum dot layers 191 to 195 respectively have composition-different structures.

For example, when the quantum dots 166 are composed of $In_{0.5}Ga_{0.5}N$, the quantum dots 168 are able to be composed of $In_{0.4}Ga_{0.6}N$. In this case, operation and effect, similar with the case when the quantum dots 167 are formed in the window-areas 191Ma, 191Mb to 195Ma, 195Mb, are able to be obtained. As illustrated in FIG. 25, note that the quantum dots 168 are able to have the same size with the quantum dots 167, the quantum dots 168 are able to have the same size with the quantum dots 166.

Fourth Modified Example

Next, the thermally assisted magnetic head and the light source-unit, according to the fourth modified example, will be explained with reference to FIG. 28. The thermally assisted magnetic head and the light source-unit, according to the fourth modified example, is different in the active layer of the laser diode 130, as compared with the above-described thermally assisted magnetic head 380, the light source-unit 360. Namely, in case of the above-described thermally assisted magnetic head 380, the light source-unit 360, the laser diode 130 includes the active layer 145. On the other hand, in case of the thermally assisted magnetic head, the light source-unit, according to the fourth modified example, the laser diode includes an active layer 275, illustrated in FIG. 28.

The active layer 275 includes the five quantum dot layers 201, 202, 203, 204, 205. The active layer 275 has the multi-layered structure which the five quantum dot layers 201 to 205 are stacked, similar with the active layer 145.

Figure 28:
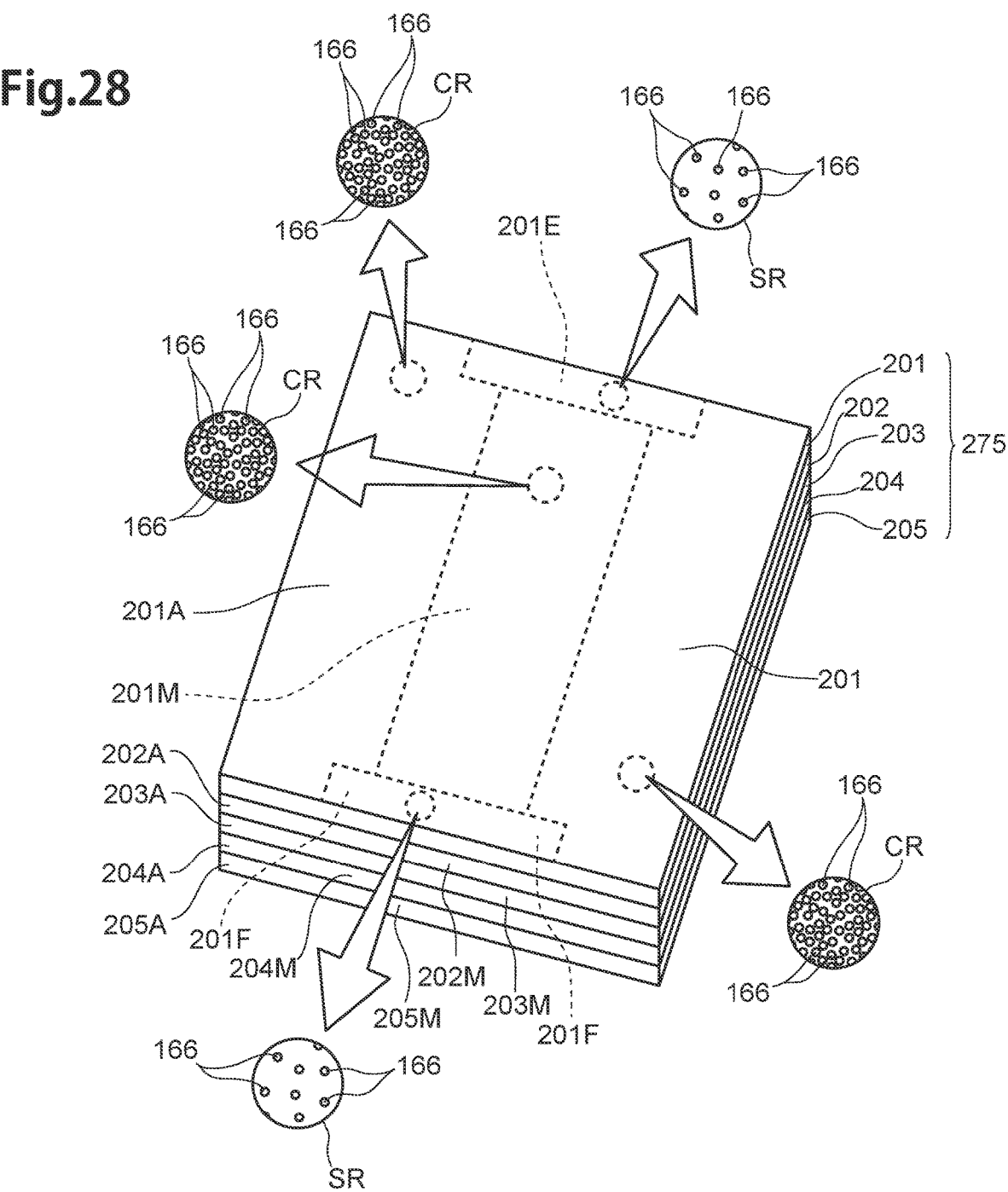
FIG. 28 is a perspective view showing the active layer, according to the fourth modified example, seen from the first layered quantum dot layer.

Further, as illustrated in FIG. 28, a plurality of quantum dots 166 are formed in the respective quantum dot layers 201 to 205, similar with the quantum dot layers 161 to 165.

Moreover, the quantum dot layers 201 to 205 respectively include stripe-areas 201M, 202M, 203M, 204M, 205M and side-areas 201A, 202A, 203A, 204A, 205A, similar with the quantum dot layers 161 to 165.

Then, window-areas 201E, 201F, 202E, 202F, 203E, 203F, 204E, 204F, 205E, 205F are formed in the respective stripe-areas 201M, 202M, 203M, 204M, 205M (illustrating is omitted about the window-areas 202E to 205E, 202F to 205F). Further, the window-areas 201E, 201F to 205E, 205F are the low-density areas.

In case of the window-areas 201E, 201F to 205E, 205F, as illustrated in FIG. 28, the lengths of the direction along by an end surface of the active layer 275 are extended than the stripe-areas 201M to 205M. Therefore, absorptions of the laser-light L, in the window-areas 201E, 201F to 205E, 205F, are hard to occur, as compared with the active layer 145. Therefore, in case of the light source-unit including the active layer 275, power consumption is reduced than the light source-unit 360 including the active layer 145. Further, the heat phenomena due to light absorption at the edge of the laser diode 130 can be suppressed, thereby the lifetime of the laser diode 130 can be improved. Besides, in case of the light source-unit including the active layer 275, operation and effect, similar with the light source-unit 360 including the active layer 145, are able to be obtained.

Fifth Modified Example

Next, the thermally assisted magnetic head and the light source-unit, according to the fifth modified example, will be explained with reference to FIG. 29. The thermally assisted magnetic head and the light source-unit, according to the fifth modified example, is different in the active layer of the laser diode 130, as compared with the above-described thermally assisted magnetic head 380, the light source-unit 360. Namely, in case of the above-described thermally assisted magnetic head 380, the light source-unit 360, the laser diode 130 includes the active layer 145. On the other hand, in case of the thermally assisted magnetic head, the light source-unit, according to the fifth modified example, the laser diode includes an active layer 285, illustrated in FIG. 29.

The active layer 285 includes the five quantum dot layers 211, 212, 213, 214, 215. The active layer 285 has the multi-layered structure which the five quantum dot layers 211 to 215 are stacked, similar with the active layer 145.

Figure 29:
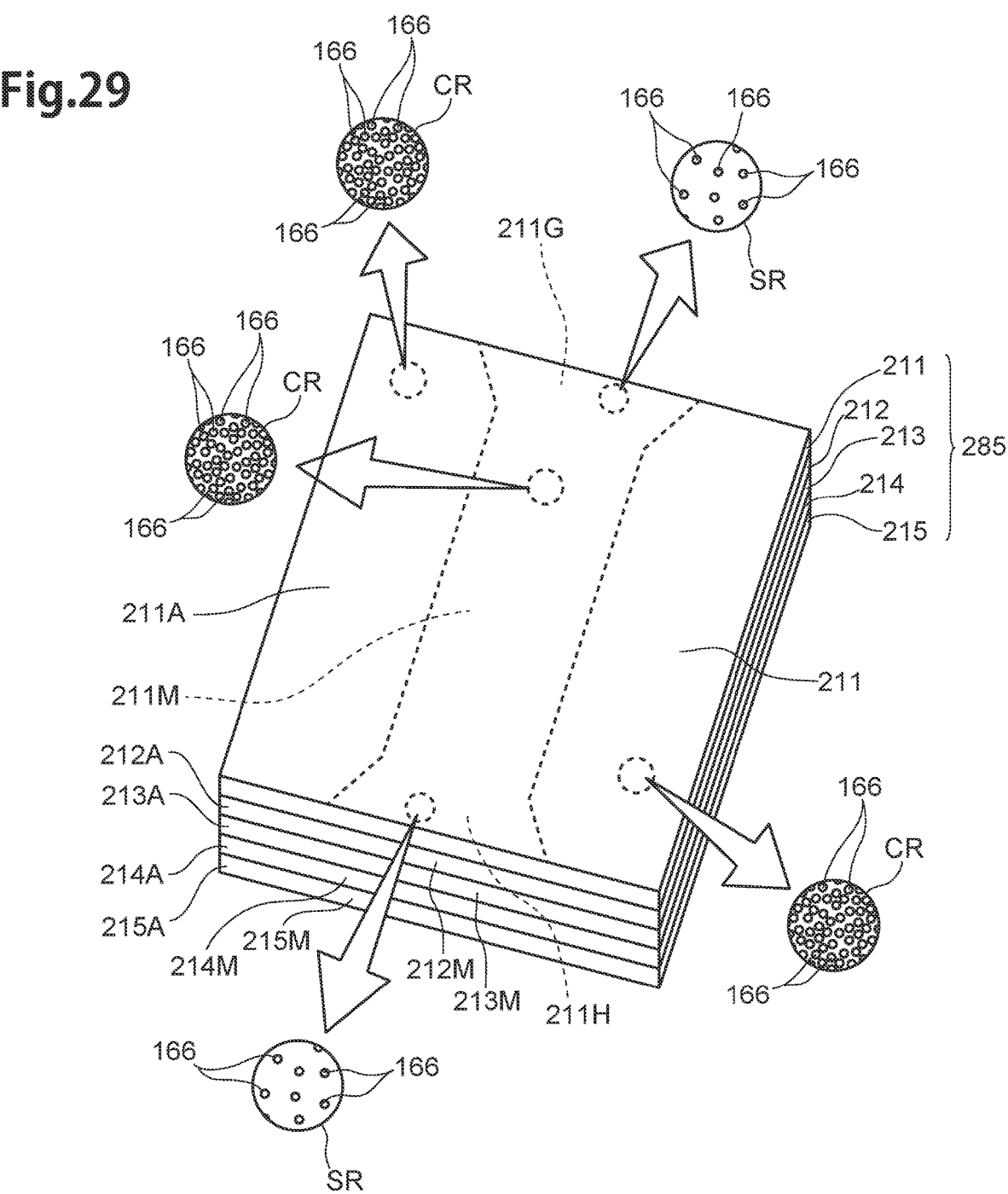
FIG. 29 is a perspective view showing the active layer, according to the fifth modified example, seen from the first layered quantum dot layer.

Further, as illustrated in FIG. 29, a plurality of quantum dots 166 are formed in the respective quantum dot layers 211 to 215, similar with the quantum dot layers 161 to 165.

Moreover, the quantum dot layers 211 to 215 respectively include stripe-areas 211M, 212M, 213M, 214M, 215M and side-areas 211A, 212A, 213A, 214A, 215A, similar with the quantum dot layers 161 to 165.

Then, window-areas 211G, 211H, 212G, 212H, 213G, 213H, 214G, 214H, 215G, 215H are respectively formed in the stripe-areas 211M, 212M, 213M, 214M, 215M (illustrating is omitted about the window-areas 212G to 215G, 212H to 215H). Further, the window-areas 211G, 211H to 215G, 215H are the low-density areas.

In case of the window-areas 211G, 211H to 215G, 215H, as illustrated in FIG. 29, the lengths of the direction along by an end surface of the active layer 285 are extended than the stripe-areas 211M to 215M, as they gradually approach the end surface of the active layer 285. Therefore, absorptions of the laser-light L, in the window-areas 211G, 211H to 215G, 215H, are hard to occur, as compared with the active layer 145. Therefore, in case of the light source-unit including the active layer 285, power consumption is reduced than the light source-unit 360 including the active layer 145. Further, the heat phenomena due to light absorption at the edge of the laser diode 130 can be suppressed, thereby the lifetime of the laser diode 130 can be improved. Besides, in case of the light source-unit including the active layer 285, operation and effect, similar with the light source-unit 360 including the active layer 145, are able to be obtained.

(Embodiments of Head Gimbal Assembly and Hard Disk Drive)

Next, embodiments of the head gimbal assembly and hard disk drive will now be explained with reference to FIG. 30 to FIG. 31.

Figure 30:
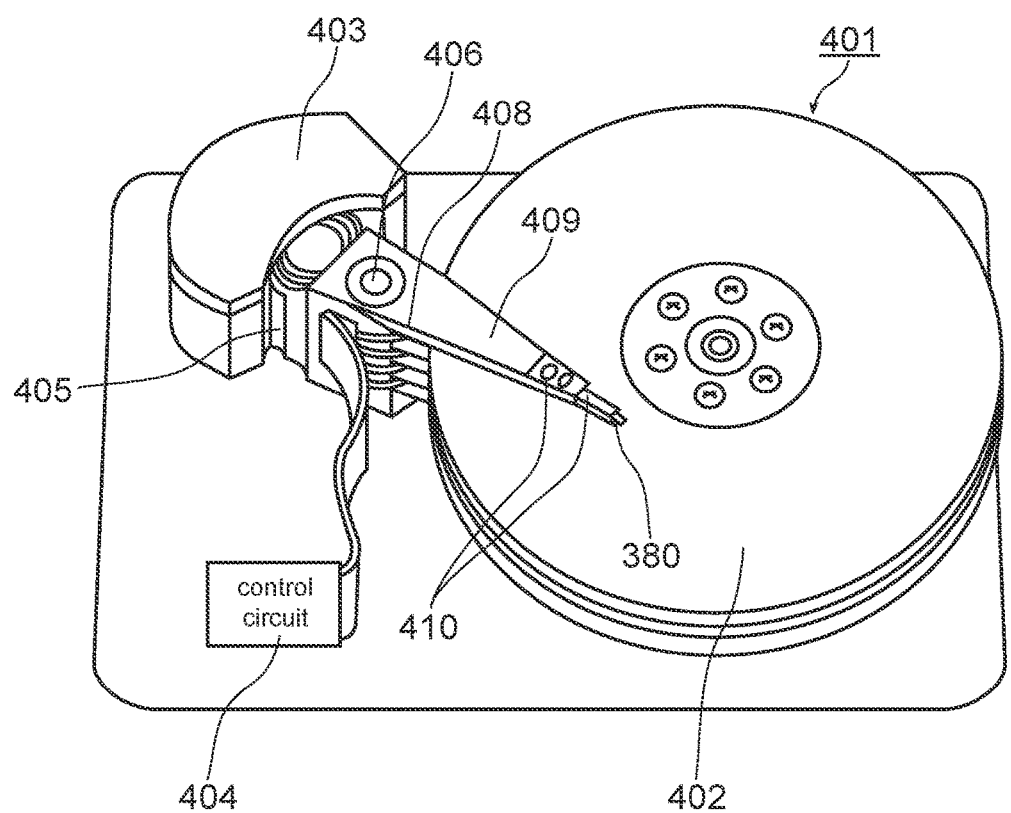
FIG. 30 is a perspective view illustrating a hard disk drive equipped with the thermally assisted magnetic head in FIG. 1.

FIG. 30 is a perspective view showing a hard disk drive 401 equipped with the above-mentioned thermally assisted magnetic head 380. The hard disk drive 401 includes a hard disk (magnetic recording medium) 402 rotating at a high speed and a head gimbal assembly (HGA) 410. The hard disk drive 401 is an apparatus which actuates the HGA 410, so as to record/reproduce data onto/from recording surfaces of the hard disk 402. The hard disk 402 has a plurality of (4 in the drawing) platters. Each platter has a recording surface opposing its corresponding the thermally assisted magnetic head 380.

The hard disk drive 401 positions the slider 120 on a track by an assembly carriage device 403. Further, the hard disk drive 401 has a plurality of drive arms 409. The drive arms pivot about a pivot bearing shaft 406 by means of a voice coil motor (VCM) 205, and are stacked in a direction along the pivot bearing shaft 406. Further, the HGA 410 is attached to the tip of each drive arm.

Further, the hard disk drive 401 has a control circuit 404 controlling recording/reproducing and the generation of light by the laser diode 130.

Figure 31:
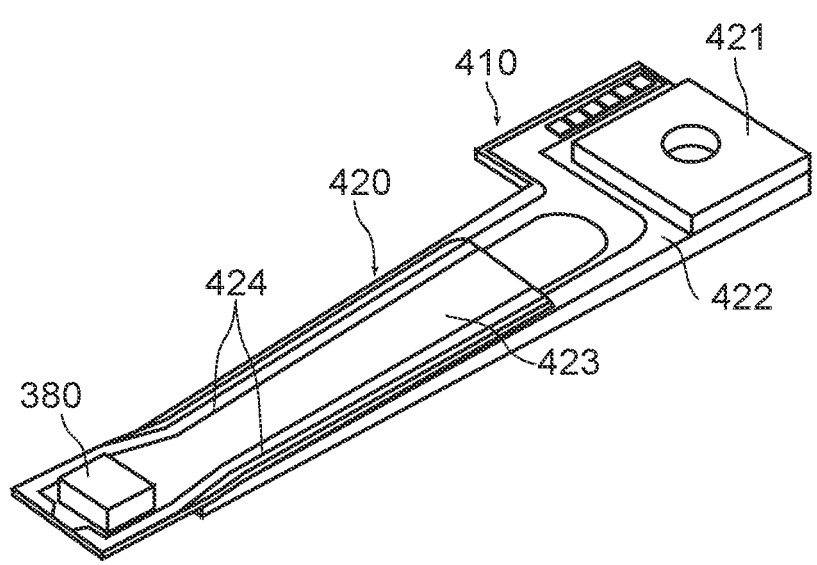
FIG. 31 is a perspective view illustrating a rear side of the HGA.
Figure 32:
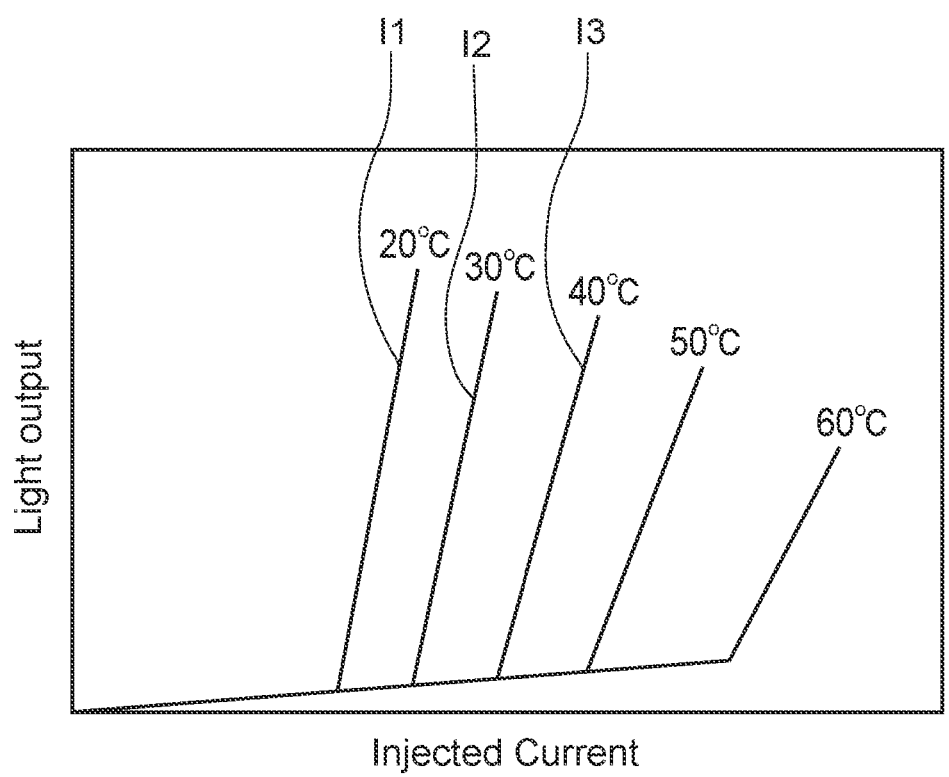
FIG. 32 is a graph showing intensity of optical output to a current of the laser diode.

FIG. 31 is a perspective view illustrating a rear surface side of the HGA 410. In the HGA 410, the thermally assisted magnetic head 380 is fixed to a tip portion of a suspension 420. Further, in the HGA 410, one end portion of a wiring member 424 is electrically connected to a terminal electrode of the slider 120.

The suspension 420 has a load beam 422, a base plate 421 provided at a base portion of the load beam 422, a flexure 423 fixed to and supported on the load beam 422 from the tip end side to the front side of the base plate 421 and having elasticity, and the wiring member 424. The wiring member 424 has a lead conductor and connection pads electrically connected to both ends of the lead conductor.

In the hard disk drive 401, when the HGA 410 is rotated, the slider 120 moves in a radial direction of the hard disk 402, i.e., a direction traversing track lines.

Because the aforementioned HGA 410 and hard disk drive 401 have the thermally assisted magnetic head 380, the laser diode 130, of the light source-unit 360, is devised so as to be insensible to temperature, thereby the recording quality of the thermally assisted magnetic head 380 is stable.

Though the above-mentioned embodiments explain a type in which a thin-film coil is wound like a flat spiral about the main magnetic pole layer by way of example, the present invention is also applicable to a type in which the thin-film coil is wound helically about the main magnetic pole layer. Further, in the above-mentioned embodiments, the case, which the five quantum dot layers are included, are exemplarily explained though as the active layer 145, it is preferable that the active layer includes at least two quantum dot layers.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A light source-unit which is used for a thermally assisted magnetic head comprising:
    a laser diode; and
    a sub-mount which the laser diode is joined;
    wherein the laser diode comprises an optical generating layer including an active layer which emits laser-light and cladding layers being formed so as to sandwich the active layer,
    wherein the active layer comprises a quantum dot layer including a plurality of quantum dots, which respectively confine movements of carriers in the three-dimensional directions,
    wherein the active layer comprises at least two quantum dot layers,
    wherein the active layer comprises a multi-layered structure which the at least two quantum dot layers are stacked,
    wherein the quantum dot layer comprises a low-density area of which arrangement density of the quantum dots is lower than the other areas.

2. A light source-unit which is used for a thermally assisted magnetic head comprising:
    a laser diode; and
    a sub-mount which the laser diode is joined;
    wherein the laser diode comprises an optical generating layer including an active layer which emits laser-light and cladding layers being formed so as to sandwich the active layer,
    wherein the active layer comprises a quantum dot layer including a plurality of quantum dots, which respectively confine movements of carriers in the three-dimensional directions;
    wherein the quantum dot layer comprises a low-density area of which arrangement density of the quantum dots is lower than the other areas.

3. A light source-unit which is used for a thermally assisted magnetic head comprising:
    a laser diode; and
    a sub-mount which the laser diode is joined;
    wherein the laser diode comprises an optical generating layer including an active layer which emits laser-light and cladding layers being formed so as to sandwich the active layer,
    wherein the active layer comprises a quantum dot layer including a plurality of quantum dots, which respectively confine movements of carriers in the three-dimensional directions;
    wherein the laser diode includes a stripe electrode being formed in a straight band-like shape,
    wherein the quantum dot layer comprises a low-density area of which arrangement density of the quantum dots is lower than the other areas, the low-density area is arranged in a stripe-area, corresponding to the stripe electrode.

4. The light source-unit according to claim 3,
    wherein the low-density area is arranged in a window-area, of the stripe-area, corresponding to a laser light emitting part which laser light is emitted.

5. The light source-unit according to claim 1,
    wherein the laser diode includes a stripe electrode being formed in a straight band-like shape,
    wherein the multi-layered structure is a structure which window-formed quantum dot layers are stacked as the quantum dot layers, the window-formed quantum dot layer includes low-density areas of which arrangement density of the quantum dots are lower than the other areas, the low-density areas are arranged in window-areas, of stripe-areas corresponding to the stripe electrode, corresponding to a laser light emitting part which laser light is emitted.

6. The light source-unit according to claim 1,
    wherein the multi-layered structure is a structure which even dot layers and uneven dot layers are stacked alternately, the even dot layers include the quantum dots, being formed in almost the whole of the respective quantum dot layers, and the uneven dot layers include non-dot areas, in which the quantum dots are not formed.

7. The light source-unit according to claim 6,
    wherein the non-dot areas are arranged in window-areas corresponding to laser light emitting part which laser light is emitted, in the respective uneven dot layers.

8. The light source-unit according to claim 1,
    wherein the multi-layered structure is a structure which even dot layers and uneven dot layers are stacked so that the even dot layers sandwich the uneven dot layers, the even dot layers include the quantum dots, being formed in almost the whole of the respective quantum dot layers, and the uneven dot layers include non-dot areas, in which the quantum dots are not formed.

9. The light source-unit according to claim 8,
    wherein the non-dot areas are arranged in center-areas, including center parts of the uneven dot layers.

10. The light source-unit according to claim 4,
wherein the quantum dot layer comprises size different structure which sizes of the quantum dots, formed in the low-density areas, are larger than sizes of the quantum dots, formed in the areas other than the low-density areas.

11. The light source-unit according to claim 4,
wherein the quantum dot layer comprises composition-different structures which compositions of the quantum dots, formed in the low-density areas, are different from compositions of the quantum dots, formed in the areas other than the low-density areas.

12. The light source-unit according to claim 4,
wherein the window-areas have lengths, of the direction along by an end surface of the active layer, being extended than the stripe-areas, in the respective quantum dot layers.

13. The light source-unit according to claim 4,
wherein the window-areas have lengths, of the direction along by an end surface of the active layer, being extended than the stripe-areas, as they gradually approach the end surface of the active layer, in the respective quantum dot layers.

14. A thermally assisted magnetic head comprising:
a slider; and
a light source-unit joined to the slider,
wherein the slider comprises a slider substrate and a magnetic head part, being formed in the slider substrate,
wherein the magnetic head part comprises a waveguide in which laser light, emitted from the light source-unit, is irradiated,
wherein the light source-unit comprises a laser diode and a sub-mount which the laser diode is joined;
wherein the laser diode comprises an optical generating layer including an active layer which emits laser-light and cladding layers being formed so as to sandwich the active layer,
wherein the active layer comprises a quantum dot layer including a plurality of quantum dots, which respectively confine movements of carriers in the three-dimensional directions,
wherein the quantum dot layer comprises a low-density area of which arrangement density of the quantum dots is lower than the other areas,
wherein the quantum dot layer opposes to the waveguide.

15. The thermally assisted magnetic head according to claim 14,
wherein the active layer comprises a multi-layer structure which the quantum dot layers are stacked.

16. The thermally assisted magnetic head according to claim 14,
wherein laser diode includes a stripe electrode being formed in a straight band-like shape,
wherein the quantum dot layer comprises a low-density area of which arrangement density of the quantum dots are lower than the other areas, the low-density area is arranged in a stripe-area, corresponding to the stripe electrode.

17. The thermally assisted magnetic head according to claim 16,
wherein the low-density areas are arranged in window-areas corresponding to laser light emitting part which laser light is emitted.

18. A head gimbal assembly comprising a thermally assisted magnetic head,
wherein the thermally assisted magnetic head comprising:
a slider; and
a light source-unit joined to the slider,
wherein the slider comprises a slider substrate and a magnetic head part, being formed in the slider substrate,
wherein the magnetic head part comprises a waveguide in which laser light, emitted from the light source-unit, is irradiated,
wherein the light source-unit comprises a laser diode and a sub-mount which the laser diode is joined;
wherein the laser diode comprises an optical generating layer including an active layer which emits laser-light and cladding layers being formed so as to sandwich the active layer,
wherein the active layer comprises a quantum dot layer including a plurality of quantum dots, which respectively confine movements of carriers in the three-dimensional directions,
wherein the quantum dot layer comprises a low-density area of which arrangement density of the quantum dots is lower than the other areas,
wherein the quantum dot layer opposes to the waveguide.

19. A hard disk drive comprising a head gimbal assembly having a thermally assisted magnetic head, and a magnetic recording medium opposing the thermally assisted magnetic head,
wherein the thermally assisted magnetic head comprising:
a slider; and
a light source-unit joined to the slider,
wherein the slider comprises a slider substrate and a magnetic head part, being formed in the slider substrate,
wherein the magnetic head part comprises a waveguide in which laser light, emitted from the light source-unit, is irradiated,
wherein the light source-unit comprises a laser diode and a sub-mount which the laser diode is joined;
wherein the laser diode comprises an optical generating layer including an active layer which emits laser-light and cladding layers being formed so as to sandwich the active layer,
wherein the active layer comprises a quantum dot layer including a plurality of quantum dots, which respectively confine movements of carriers in the three-dimensional directions,
wherein the quantum dot layer comprises a low-density area of which arrangement density of the quantum dots is lower than the other areas,
wherein the quantum dot layer opposes to the waveguide.

* * * * *